United States Patent [19]
Kita et al.

[11] Patent Number: 5,408,597
[45] Date of Patent: Apr. 18, 1995

[54] METHOD AND APPARATUS FOR SCHEMATIC ROUTING

[75] Inventors: Ronald A. Kita, Hollis, N.H.; Kaare H. Klevjer, Westford, Mass.; Ramesh H. Vaswani, Nashua, N.H.

[73] Assignee: Digital Equipment Corporation, Maynard, Mass.

[21] Appl. No.: 100,001

[22] Filed: Jul. 29, 1993

[51] Int. Cl.⁶ ............................................. G06F 15/00
[52] U.S. Cl. ................................................... 395/140
[58] Field of Search ............... 395/140, 141, 142, 143, 395/155, 161; 345/135, 136, 16, 17, 18

[56] References Cited

U.S. PATENT DOCUMENTS

| | | | |
|---|---|---|---|
| 4,794,553 | 12/1988 | Watanabe et al. | 364/710.01 |
| 5,276,789 | 1/1994 | Besow et al. | 395/140 |
| 5,278,951 | 1/1994 | Camacho et al. | 395/140 |

OTHER PUBLICATIONS

"State Transition Editor–Version 1.2"–User's Guide–Digital Corporation, Jun. 1993.

*Primary Examiner*—Phu K. Nguyen
*Attorney, Agent, or Firm*—Arthur W. Fisher; Gary E. Ross

[57] ABSTRACT

An apparatus and method for generating connected graphs for display on a computer monitor. A data structure and virtual map are defined which provide a linked list of objects appearing at any location in the connected graph, the virtual map being larger than the dimensions of the display monitor if the connected graph demands larger dimensions. Commands carried out with respect to any object on the monitor are correlated with the cell maps in the virtual map, which point to the linked lists of objects, the lists in turn pointing to objects stored in an object records database. This provides rapid access to all objects at any given location on the display or in the connected graph. When a user gives a command to create a connection between two objects in the graph, the method generates the shortest connection possible, in terms of both pixel length and arc length for arc-connections, balanced against a minimization of collisions by the connection with existing objects, including other connections. The method is described in connection with the generation of graphical models of finite state machines (FSMs), but is suitable for use in any system where it is desirable to rapidly produce connected graphs and to maintain a minimum, user-definable level of clarity and legibility of the graph.

17 Claims, 16 Drawing Sheets

METHOD AND APPARATUS FOR SCHEMATIC ROUTING

BACKGROUND OF THE INVENTION

The present invention is directed to the generation of connected graphs on a computer for display on a monitor. Many applications today use graphical displays of their information, notably CAD (computer-aided design) applications, electronic circuit (schematic) design applications, and other graphics programs, particularly "paint" or "draw" programs. Certain applications, such as circuit design applications, include objects displayed on a monitor that are "live" or "intelligent", i.e. correspond to routines of the application that execute functions designed to simulate a real device, such as an electronic circuit.

These applications have in common that they can be used to generate connected graphs on screen, i.e. graphics including objects that are connected by lines, arcs, or the like, often illustrating a functional or hierarchical relationship among the objects. This is true also of applicant's graphical interface application "State Transition Editor", the user's manual. The generation of such connected graphs may be referred to generally as schematic routing.

Graphics produced by such applications are an indispensable tool in the design processes of many areas, such as electronic circuit design and, in the case of applicant's STE, the design of finite state machines to model specifications of applications or of real-life problems and systems. Applications for rendering and displaying computer architectures also rely heavily upon graphics, and it is important that they be clear and readable.

It is important that such graphics be readily intelligible, or they fail at their intended purpose. While CAD and electronic design applications provide for the graphical (and functional) interconnection of displayed objects, they do not provide a mechanism that allows the user to easily read the result; rather, connected graphs produced by applications currently available generally route the connections in a manner convenient to the application, rather than intelligible by the user.

A particular problem in the display of connected graphs is the routing of connections through other connections or through other objects (blocks in a block diagram, for example) appearing on screen. A system is needed for all such applications that can produce schematic routing by intelligently avoiding needless or numerous connection crossovers and collisions with objects.

Graphical objects are typically stored in an object records database. When a region on a screen is accessed by a mouse or other device, conventional systems will conduct a search through the database to determine which object or objects are located at the accessed position. Known approaches to this type of search are those used by Quad-tree, KD-tree, and balanced AVL tree, which are widely used public-domain algorithms.

This type of object location and access is time-consuming, and is particularly inappropriate for a system that must repeatedly and rapidly identify and analyze all objects located at numerous locations. This is a barrier to the design of a system for generating connected graphs, since to analyze many possible connections requires just such repeated identification and analysis of objects and their locations.

SUMMARY OF THE INVENTION

The method and apparatus of the invention provide for automatic schematic routing in graphics applications, to generate connected graphs for display on a monitor or for printing. The graphs are connected in such a way that overlap between connections is minimized, and collision between connections and objects on the display are in many cases eliminated. The method is implemented in software stored in a conventional computer.

When a user issues the commands to generate a connection between objects displayed on the monitor, the system inspects the region between the objects for possible blockage of the connection, and for collisions with certain types of objects, such as other object icons and other connections between objects. Connections are spaced to allow for text annotations.

Each object and connection is correlated with a number of active cells defining the general region on the screen that the object or connection overlies. A combination of analyses is carried out to select the connection having the fewest cells overlapping cells of other objects or connections, and at the same time to select the shortest connection possible, and one having a minimum arc length (for arc-shaped connections).

Some connections are loops from an object back onto itself. A similar analysis is carried out for such loops, the system selecting the shortest loop that is not rejected for colliding with a predefined list of objects, factored in with the lowest possible number of colliding cells. Different angles relative to the object and different lengths for the loops are attempted, and the best loop is selected, rendered and stored.

To provide for rapid object identification for all locations, the object icons and connections appearing on the display are represented in an object records database, and in a virtual map (VMAP) composed of pointers to linked lists which themselves include pointers to the object records in the database. The VMAP contains references to all objects in the connected graph, and is kept in the computer's RAM. This provides a mechanism for keeping track of all objects at any given location at any time, ensures that access to such objects is quick, and concomitantly speeds up the selection and rendering of acceptable connections for the connected graph.

The system thus provides rapid selection and generation of connections in a connected schematic, state diagram or other graphic, while maintaining clarity and intelligibility of the graphic according to criteria that can be manipulated by the user.

DESCRIPTION OF THE PREFERRED EMBODIMENTS

The description is divided into sections and attached appendices as listed below.
I. Hardware for Implementing Schematic Routing
II. Structure of the Virtual Map, Backing Store and Main Store
III. VMAP Structures Defined
IV. Generating Active Cells
V. Method for Schematic Routing
  A. Schematic Routing of Normal Arcs: Selection and Generation
    1. The routine "make arc".
    2. Selecting the best unblocked arc.
    3. Selecting the best blocked arc.
  B. Schematic Routing of Looped Arcs: Selection and Generation
  C. Finalizing the Selected Arc
    1. Adding a normal edge.
    2. Adding a looped arc.
Appendices:
Appendix A: Pseudocode for Schematic Routing Method
Appendix B: Pseudocode for Generating Active Cells

I. Hardware for Implementing Schematic Routing

Figure 1:
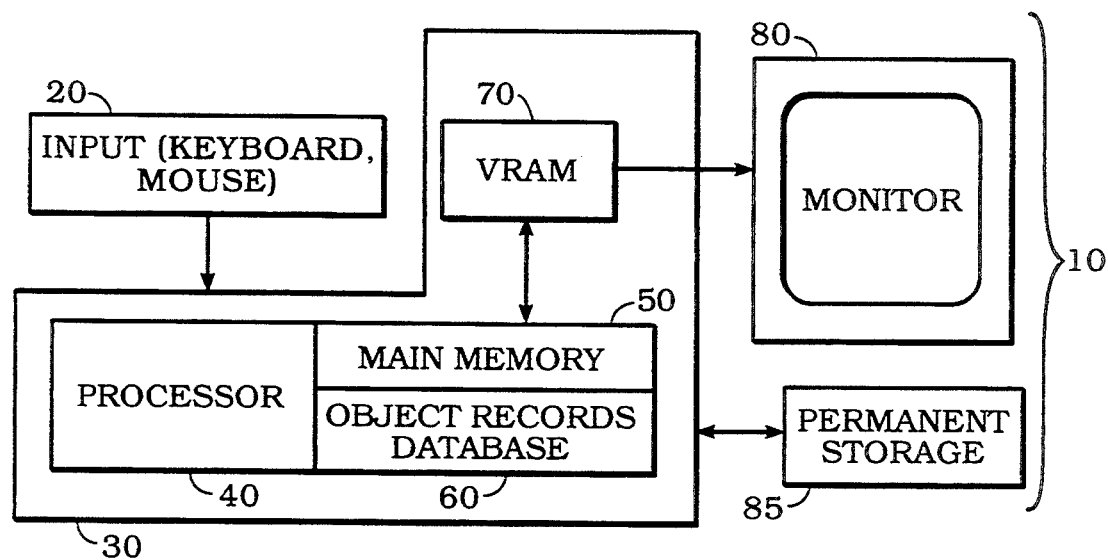
FIGS. 1 and 2 are block diagrams of apparatus for implementing the present invention.
Figure 2:
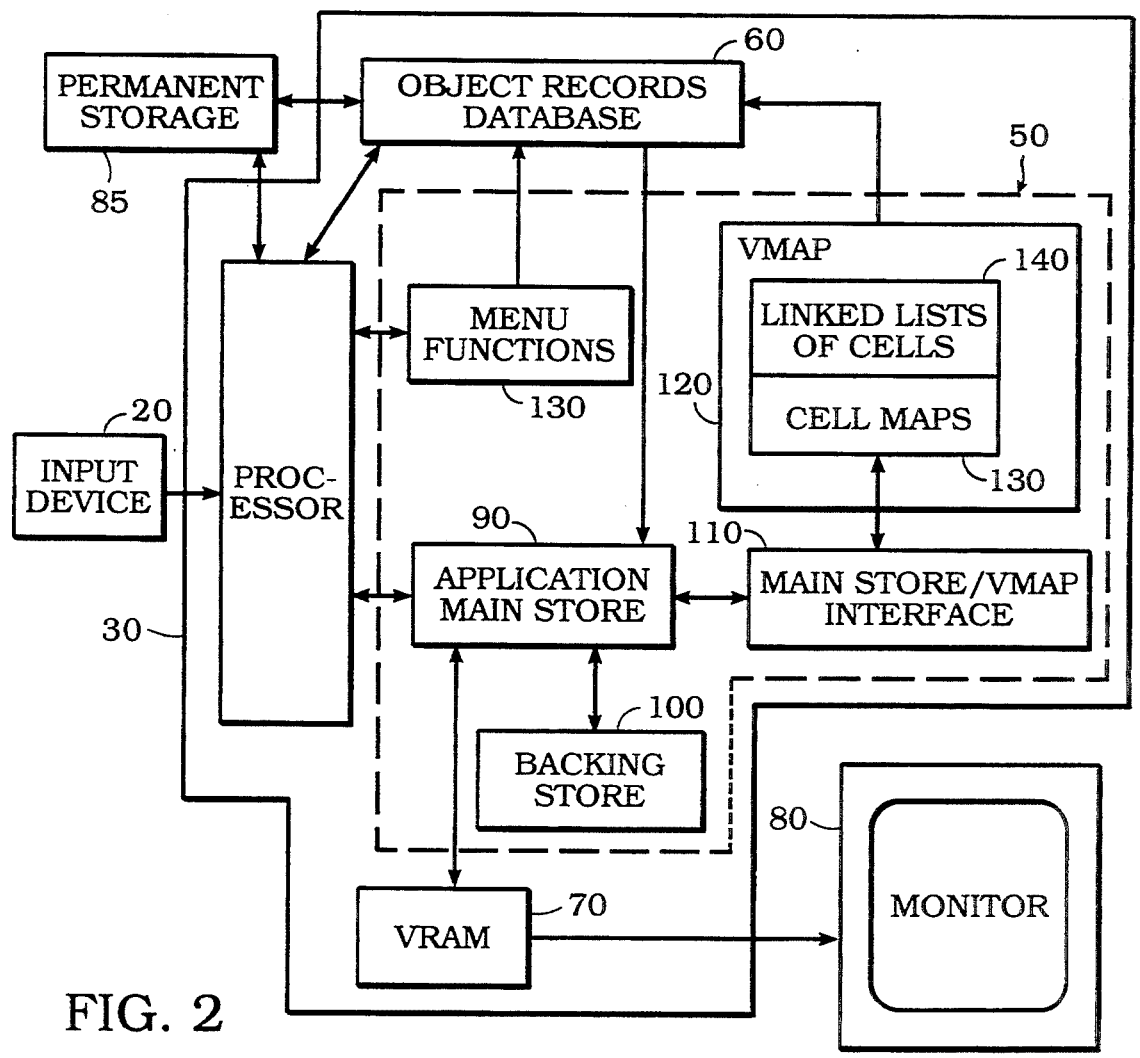

FIGS. 1 and 2 are block diagrams of hardware for implementing the present system 10 for schematic routing. The system includes an input device 20, which may be a keyboard, mouse, pen-driven input, touch screen, or any other conventional means for inputting data by a user, both graphical and textual. The input device is coupled to a computer 30, which may be broadly taken to be a personal computer, a workstation, a terminal connected to a central server, or the like. Computer output is displayed on a monitor 80.

The computer 30 is conventional, including a processor 40 coupled to a main memory 50 with an object records database (or "objects database") 60 (which may, if desired, be stored elsewhere than in the main memory, or may be a subset thereof). Permanent storage 85 (which may be a disk drive, tape backup, etc.) provides stable storage of the data in the database 60.

The main memory 50 is coupled to video random access memory (VRAM) 70, which is in turn coupled to the monitor 80. Thus, the system 10 is adapted for displaying objects in the database 60, in a manner to be described.

FIG. 2 shows greater detail of the main memory 50 (surrounded by the dotted line). In application main store region 90, the main memory 50 stores a graphics application, which may be an electronic schematic design application, a CAD program, a drawing program without "intelligent" objects (i.e. a conventional "paint" or "draw" application), or another conventional graphics program, and may in particular be applicant's State Transition Editor (STE) application, by which the examples in this application were generated. The graphics application to be used with the invention may alternatively be stored in a separate region from the main store region 90.

The STE application is specifically designed for the generation and editing of extended finite state machines (EFSMs), including applicant's architectures of multiple-model EFSMs. Such architectures are not specifically the subject matter of the present disclosure, but the instant invention is useful in connection building them, as well as other types of graphical structures.

Input to the system in FIGS. 1 and 2 may be one of two types, the first being functions from menus or keyboard commands (such as store, delete, etc.), which are routed through the menu functions software module 130 to access and manipulate the object records database 60. The menu functions are standard operating system functions used in systems using a database.

Alternatively, mouse or keyboard commands that affect the graphics objects displayed on the monitor 80, such as commands within the application stored in the main store region 90, are routed through the region 90.

The main store region 90 includes not only the graphics application itself, but also a block of memory reserved for data which is blitted (prepared pixel by pixel) to VRAM 70 and to the monitor 80 for display. The main store region 90 is coupled to a backing store region 100, which includes a subset of the data in the main store, used in a manner to be described.

The main store region 90 is also coupled via an interface 110 to a virtual map (VMAP) region 120, which includes cell maps 130 and a block 140 including linked lists of cells, the latter being coupled to the object records database 60.

Modifications to objects can be carried out by keyboard commands, but are preferably accomplished by a mouse, trackball, computer pen, or the like, using a graphical interface. The input device 20 is thus used to manipulate objects appearing on the monitor 80. When a change is input by the user, it is carried out in the main store 90, and is communicated to the VMAP 120 via the interface 110. The main store 90 includes information about the x-y position (horizontal and vertical displacement) of the object that the user is manipulating. The interface 110 converts the x-y position to a memory location of a cell map stored in region 130. The appropriate cell map includes a pointer to a corresponding linked list (discussed below) stored in region 140, and that linked list is updated as necessary. Modifications, deletions, etc. of an object are communicated via the linked list region 140 to the database 60, and are implemented there. The data in the database 60 is ultimately stored in the permanent storage 85.

When the system is shut down, all information is typically lost except that stored in the storage 85 (assuming the use of volatile memory for main memory 50). Thus, when the system is started up, the processor loads the information in the storage 85 into the database 60, and the main store 90 is loaded from the database 60. This information from the main store region 90 is used to build up both the information in the VMAP region 120 and the information in the backing store region 100.

II. Structure of the Virtual Map, Backing Store and Main Store

Figure 3:
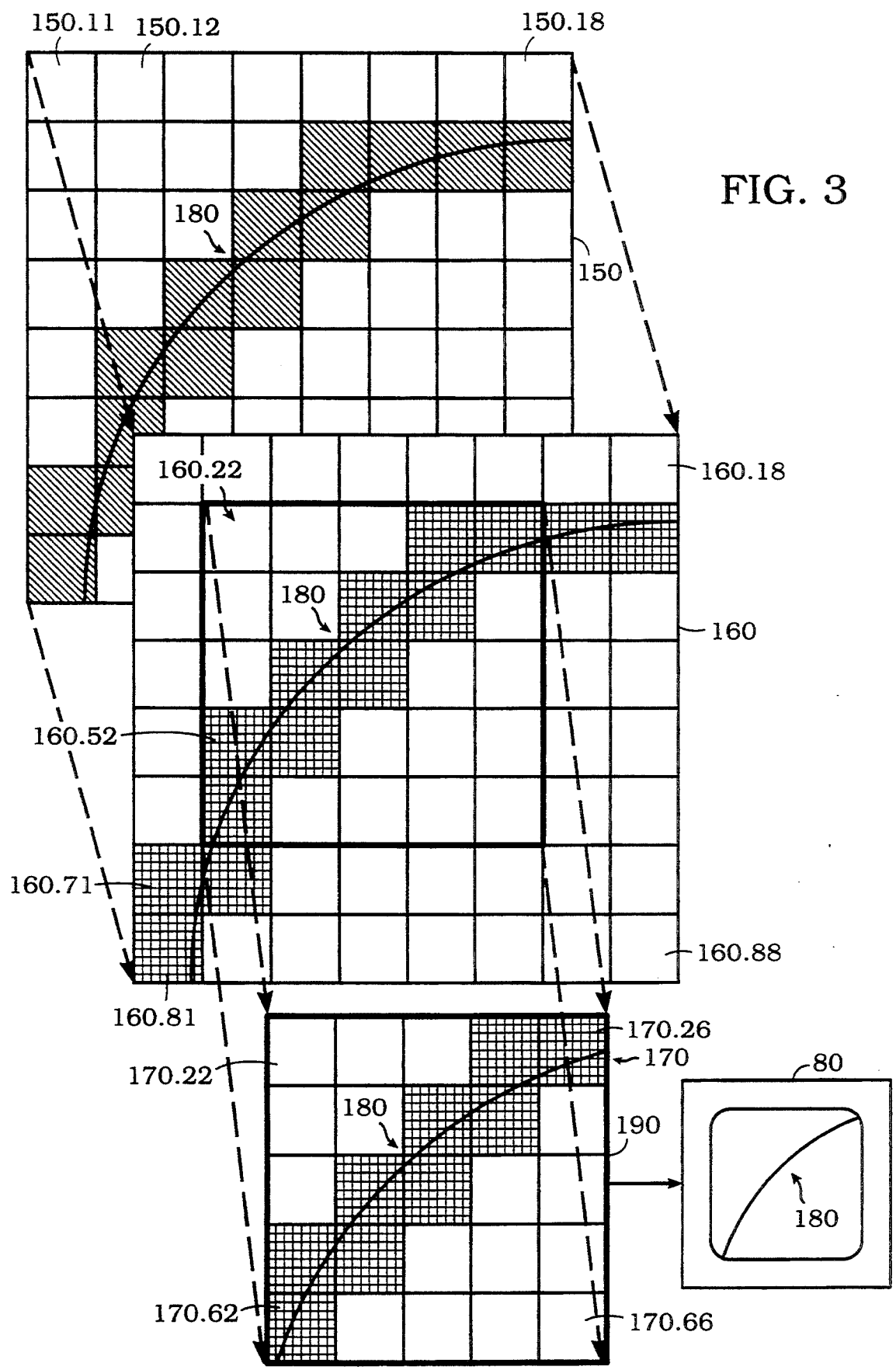
FIG. 3 is a relational diagram of a virtual map, backing store and main store for the system of the invention.

The backing store region 100 is conventional in the field of video display technology. It includes a pixel map of the data that is to be displayed on the monitor 80. FIG. 3 is a diagram illustrating the relationships between VMAP 150 stored in the VMAP region 50, display data 160 stored in backing store region 100, and a subset 170 of that display data stored in main store region 90. (Data 160 may simply be referred to as "backing store (data)", and data 170 as "main store (data)".) These data are graphics data, so their representation in FIG. 3 is an example of a how a particular graphic display of such data might look. The only graphical object being displayed in this example is arc 180.

The VMAP 150 is divided into a grid of cell maps, which are numbered for reference by a decimal suffix indicating their row and column position: 150.11 (first row, first column), 150.18 (first row, eight/last column), 150.81 (eight row, first column), and so on. The VMAP 150 in this example thus includes an 8×8 matrix of cell maps 150.11 to 150.88.

Each cell map 150.11, etc. corresponds to an array (for display) of a predetermined number of pixels; in the preferred embodiment this number is 8, so one cell map represents 64 pixels. Thus, the VMAP 150 in this example represents an (8×8) array of cell maps, each including (8×8) pixels, for a total of (8×8)×(8×8)=4096 pixels. The structure of the cell maps will be explained below.

The number of pixels that a cell map represents a compromise between object display resolution and the amount of memory needed to store the objects; other dimensions for the cell maps may be used, but 8×8 pixels has been found to be an acceptable compromise in applicant's system for the size of one cell map. On the other hand, an actual VMAP would include an array of perhaps 750×750 cell maps, representing (at 8×8 pixels per cell map) 3000×3000=9,000,000 pixels. The 8×8 VMAP 150 of FIG. 3 is kept small for the purposes of illustration.

The cell maps 150.11 through 150.88 correspond one-to-one with the backing store's pixel regions 160.11 through 160.88, respectively, which are not all numbered in the FIG. 3, but are assigned decimal suffixes in the same manner as cell maps 150.11 through 150.88. Each pixel region 160.11–160.88 is thus an 8×8 region.

The main store data 170 is a subset of the backing store data 160, and includes data corresponding to a display region 190 whose corners are pixel regions 160.22, 160.62, 160.66 and 160.62; thus, pixel regions 170.22, etc. are numbered in the same fashion, with like numerical suffixes indicating corresponding pixel regions.

The monitor 80 displays the contents of the main store 170, and has the same pixel dimensions. The dimensions in this illustration are (8×8=64 pixels per pixel region)×(5 pixel regions horizontally by 5 pixel regions vertically), or 320×320 pixels.

In a display sense, then (though not in a memory-usage sense), the VMAP 150 and the backing store 160 are the same "size", i.e. have the same dimensions; the same is true of the main store 170 vis-a-vis the monitor 180.

In the example of FIG. 3, the object stored in each of VMAP 150, backing store 160 and main store 170 is the arc 180; it is partly displayed on the monitor 180. This arc is stored as an object in the object records database 60 (see FIG. 2), as an object in the VMAP, and as a bitmap in the main store and backing store. It is blitted for display via the VRAM 70.

The cell maps traversed by the arc 180 in the representation of the VMAP 150 will be referred to as "active" cell maps; thus, cell maps 150.81, 150.71, 150.72, 150.62, 150.52, etc. (i.e, the cross-hatched cell maps) are active. The corresponding regions 160.81,160.71, etc. and 170.62, 170.61, etc. are shown with all of their pixels (eight per region). The non-active regions are not detailed in this fashion, for the sake of clarity of the drawings; however, they also consist of 8×8-pixel boxes.

Figure 4:
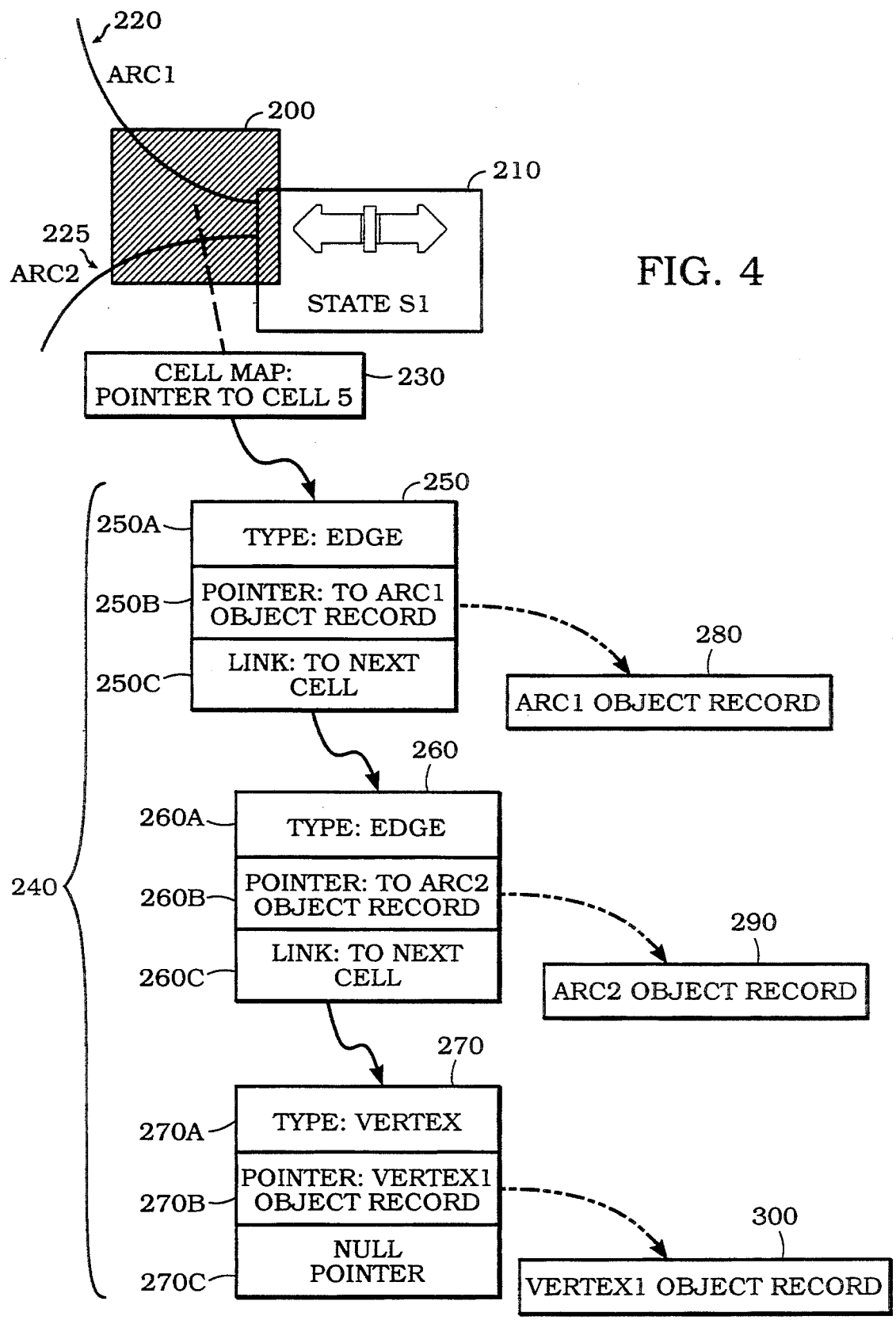
FIGS. 4 and 5 are diagrams showing the relationships between a virtual map, linked lists and object records.

The structure of the VMAP 150 is illustrated in FIG. 4, showing a single active cell map 200 occupied by three objects: a state icon 210, an arc 220 named "arc1", and an arc 225 named "arc2". These arcs and the state are standard objects in the representation of a finite state machine (FSM), but may be any graphical objects.

The cell map 200 corresponds to any of the cell maps 150.11, etc. shown in FIG. 3. Each cell map such as cell map 200 contains a pointer such as pointer 230, which points to a linked list 240 of cells 250, 260 and 270. The cell maps are stored in the cell maps region 130 of the VMAP 120, and each linked list is stored in the linked list region 140 (see FIG. 2).

Each cell includes a type field (250A, 260A, 270A), an object record pointer (250B, 260B, 270B), and a linking pointer (250C, 260C, 270C). The pointers 250B–270B point to object records 280, 290 and 300, respectively, stored in the object records database 60.

The type field 250A identifies arc1 as an "edge", which is standard term in finite state machines for an arc representing a transition from one state to another. Arc2 is similarly identified, and state 210 is identified as a "vertex", which is a standard FSM term for a state, i.e. a point of connection between two transitions, representing a particular configuration of the FSM.

The linked list 240 contains one cell for each object in the cell map 200. Cell 250 corresponds to arc1, and its linking pointer 250C points to the cell 260 corresponding to arc2. The linking pointer 260C, in turn, points to the next cell 270, corresponding to the state icon 210. There are no other objects in cell map 200, so the linking pointer 270C is a zero pointer.

When an object is deleted or moved from cell map 200, the corresponding cell is likewise deleted. Thus, if arc2 is deleted or moved, cell 260 is deleted from the linked list 240 in the linked list storage region 140 of the VMAP 120. Linking pointer 250C is then modified to point instead to cell 270. If the arc2 has been moved, then the linked list corresponding to some other cell map in the VMAP has a new cell added to it, that new cell the same structure as cell 260-except for the linking pointer, which will be a zero pointer, since the new cell will be added to the top of the linked list already existing at the new location. (The new cell could be placed anywhere in the linked list, including at the end. However, that would require more time and steps, since the lower down on the list it goes, the more links have to be traversed to locate the end of the list.)

Figure 5:
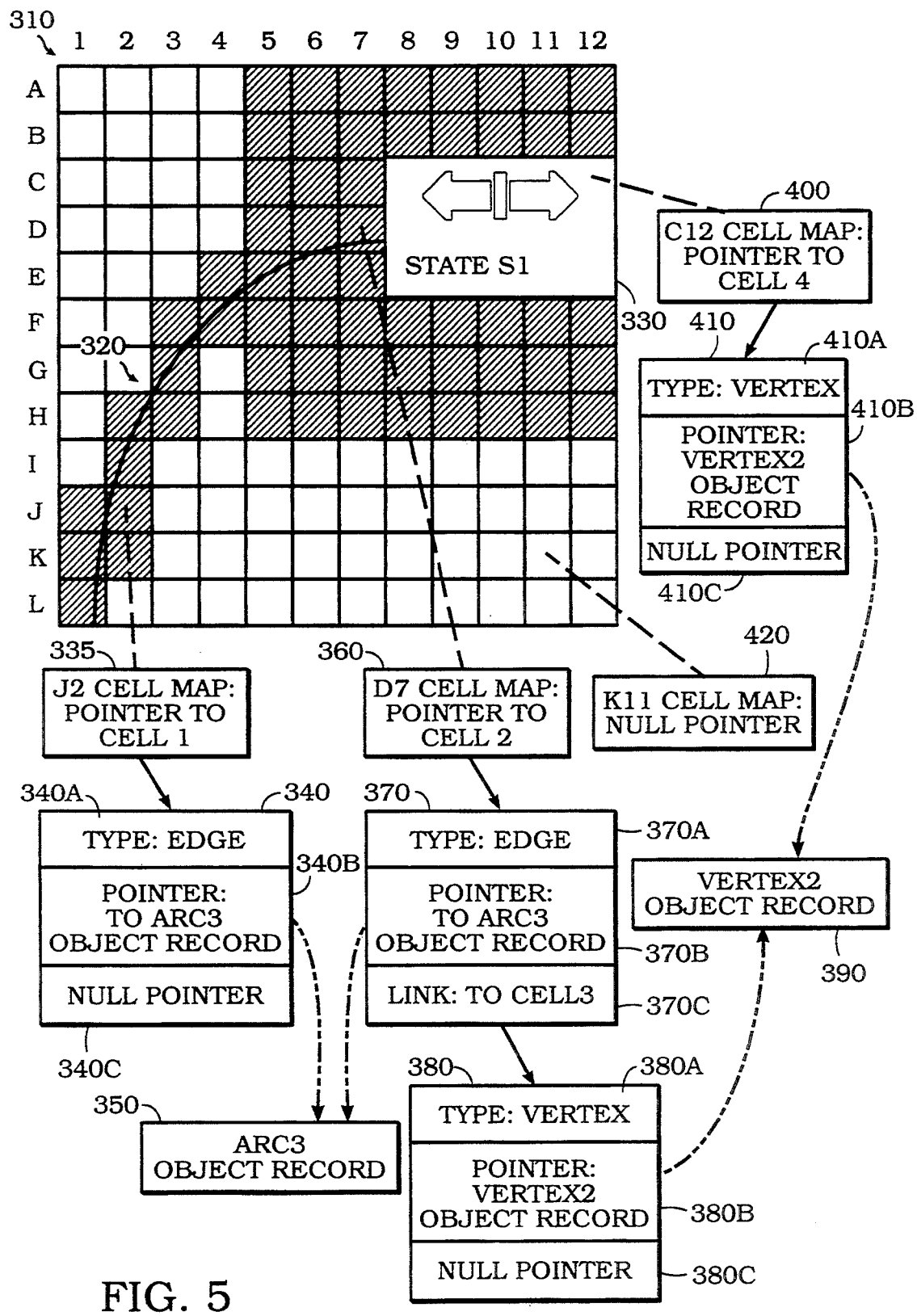

FIG. 5 shows a portion of a typical VMAP 310, with cell maps assigned alphanumeric coordinates A1 through L12 for the sake of this discussion. The cell maps in this figure have the same structure as those in FIG. 4. An arc 320 (named "arc 3") crosses the region, and connects to a state 330 (i.e. an icon representing a state). The following cell maps are made active by the position of the arc 320:

D6–7; E4–7; F3–4; G3; H2–3; I2; J1–2; K1–2; and L1.

State 330 has a three-deep set of active cell maps surrounding it (though other depths are possible). The cell maps made active by the position of state icon 330 include all of those in the rectangle bounded as follows:

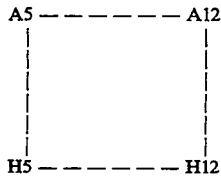

This includes the cell maps underlying the state icon 330.

Cell map J2 includes a pointer 335 to cell 340 (or "cell 1"), which in turn has a pointer 340B to the arc 3 object record 350. Arc 320 also passes through cell map D7, so the corresponding pointer 360 points to cell 370 (or "cell 2"), which in turn has a pointer 370B to the same object record 350 for arc 1. It also includes a linking pointer to cell 380 ("cell 3"), which itself includes a pointer to object record 390 corresponding to state icon 330.

Cell map C12 has only one object in it, namely the state icon 330, and includes a pointer 400 to cell 410 ("cell 4"). Object record pointer 410B points to object record 390 for that state, and includes a NULL linking pointer 410C. Cell map K11 is empty, and thus it includes only a NULL pointer 420.

The active cells are discussed in greater detail in Section IV. The use of the VMAP and its structures is explained in connection with the discussion in Section V of the method of the invention.

III. VMAP Structures Defined

The discussion in Section III above is sufficient to implement the features of the invention, given the method discussed in Section V below. Following is an example (using conventional C language) of how data structures for the VMAP might be defined; they have been designed by applicant and correspond to applicant's STE User's Manual.

The VMAP 120 is a collection of data structures, created in memory for each model (i.e. connected graph, such as in FIGS. 6-17) when it is opened. The VMAP is provided primarily for two reasons: to provide quick retrieval of model objects (vertices, edges, text) by XY coordinates, and to quickly find available space for placement of vertices, edges and text.

As noted above, the VMAP covers the same x-y coordinate range as the object records database 60 and the backing store 100. See FIG. 3. The two-dimensional matrix of cell maps that make up the VMAP are instances of a defined structure which can be called "ste_cell_map", indexed by x and y coordinates.

All translation between database coordinates (pixels) and VMAP coordinates (cell maps) is done by one set of functions ("ste_cnv_funcs") in the interface 110.

Data structures for the VMAP include:

```
typedef struct _ste_cell_map    ste_cell_map;
typedef struct _ste_cell        ste_cell;
struct _ste_cell_map
{
    ste_cell    *cell_ptr;
};
```

The pointer "cell_ptr" points to the first member of a linked list of occurrences of structure "ste_cell", or a "NULL" pointer if there are no model objects in this box. This is shown in the examples of FIGS. 4 and 5.

The structure "ste_cel 1" is a next-pointer and a type/pointer combination to a model object:

```
struct _ste_cell
{
    ste_cell       *next_cell_ptr;
    ste_cell_type  type;
    union
    {
        VERTEX     *vertex_ptr;
        EDGE       *edge_ptr;
    }
    ptr;
};
```

The pointer "next_cel 1_ptr" points to the next occurrence of structure ste_cell in a linked list, or a "NULL" pointer if this is the last cell in a link. The linked lists are either those pointed to by instances of "ste_cell_map" as described above, or it is one linked list of currently unused "ste_cell" occurrences, pointed to by "free_cell_ptr":

```
ste_cell       *free_cell_ptr;
```

The structure "type" is one of the following:

```
typedef enum
{
    ste_vertex_cell              = 0, /* Cell points to vertex */
    ste_edge_cell                = 1, /* Cell points to edge   */
    ste_t_i_registration_cell    = 2, /* Cell points to edge   */
    ste_action_text_cell         = 3, /* Cell points to edge   */
    ste_predicate_text_cell      = 4, /* Cell points to edge   */
    ste_event_text_cell          = 5, /* Cell points to edge   */
    ste_test_text_cell           = 6, /* Cell points to edge   */
    ste_constraint_text_cell     = 7, /* Cell points to edge   */
    ste_dashed_arc_cell          = 8  /* Cell points to edge   */
}
ste_cell_type;
```

The pointer "ptr" is either "vertex_ptr" or "edge_ptr", depending on "type", this option being provided by the "Union" type declaration. It points directly to the model object in the object records database.

All objects that exists in a ste_cell_map's box will be pointed to by "ste_cells" in this ste_cell_map's list of cells. The edge "ste_t_i_registration_cell" is a special edge_cell that is at the midpoint of an edge's arc, or at the tip of a looped arc (such as arc 502.2.1 in FIG. 6). A "looped arc" is one that begins and ends at the same vertex (icon or state). Its use will be described below. The text cells indicate where the curved text associated with the edges are. The text indicates the test information, event, predicate or other function associated with edge to which it is adjacent. Such text appears in the examples of FIGS. 6-17. The "dashed arc cell" will be explained in connection with the arc routing method.

These data structures are always maintained as the user creates, deletes and moves model objects. The "ste_cell_map" and "ste_cell" structure occurrences are not freed until a map is closed (i.e. stored).

IV. Generating Active Cells

Active cells are generated in the vicinity of (i.e. along the length of) a proposed arc to determine whether there will be collisions with existing objects, and if the arc is used (see Section V below), the same active cells effectively define the arc's location.

The arc may thus be defined as having an effective width, which is in general larger than the width of the arc line appearing on screen, to prevent other objects from being rendered too close for clarity; hence the active cells around the arc 320 in FIG. 4.

If the width of the arc is specified as being narrow, then it is possible for an arc to cross a corner between two cells, such as nearly happens at the common corner of cells G2, G3, H2 and H3 in FIG. 4. If this is the case, the system must artificially provide at least one extra active cell at that position (such as cell H3), so that another arc, passing through cells G2 and H3, cannot be created without generating a conflict. This prevents such undesirable traversals.

If the width of the arc is defined as very large, such as two to three cells, then there is no chance that another arc can cross it without being detected as a collision between the two arcs. However, too thick a specification for the arc will result in its occupying too much room on the screen, thus reducing the number and size of objects that may be displayed. In addition, thicker arcs require more memory to store. There is thus a compromise between the thickness of the arc and the likelihood that another object can traverse it unwanted.

The procedure of Appendix B defines active cells around an arc in such a way as to automatically make this compromise, based upon the user's predefined specifications for the width of the arc. This width is identified as "dwid", and for this example is set at two pixels. The variable "off_wid" is set to half of this, or one pixel. Other variables used in the procedure are defined in Appendix B.

The value for "pixels_per_cell" in the present embodiment is eight (either width or height). The variable "off_arc" is first set at ("pixels_per_cell"÷$\sqrt{2}$)=4$\sqrt{2}$, and then this value is used to set "off_arc" at the maximum of its previous value and the value of "off_wid", plus a small tolerance factor "ste_arctol". Since "off_wid" is equal to 1 in this case, the larger value of 4$\sqrt{2}$ is used for "off_arc". It can be seen that if "off_wid" were larger (namely at least 4$\sqrt{2}$, meaning that "dwid" would be at least 8$\sqrt{2}$), then "off_arc" would take on the value of "dwid" instead. The method thus automatically selects a certain minimum effective width for the arc. These variables may be manipulated to accommodate particular screen resolutions, memory storage and RAM available, complexity of the graphs desired, and so on.

Two other variable are defined: "inner_Rad", which is the radius of the arc (dr) minus "off_arc", and "outer_rad", which is that same radius plus "off_arc".

The for-loop inspects each cell in the enclosing (or bounding) box of the arc, this box being defined as the smallest box that can completely enclose the arc. The midpoint of the cell is located, and then the distance between this midpoint and the center point (i.e. the center of curvature) of the arc is determined. Any cell that lies inside a region defined by the inner radius and outer radius of the arc, determined by comparing the distance to the arc's center point with these inner and outer radii, is identified as an active cell i.e. is part of the arc's raster set. It is this raster set that is used in the schematic routing method to determine whether an arc collides with another object in the graph.

V. Method for Schematic Routing

The schematic routine method discussed below generates connected graphs with route edges represented by true arcs, and thus some of the method steps described are specifically for this purpose. However, the edges might alternatively be displayed as straight edges or in other desired shapes, and the basic principles of the method will still apply.

In this method, the system repeatedly inspects cells displayed on the screen and determines which objects occupy those cells. The x-y coordinates for a given cell are converted into an address in the VMAP, which allows the system to access the linked list for that region on the screen. The linked list for a given cell points to object records for all objects whose raster set identifies that cell as an active cell. The maintenance of the VMAP thus provides rapid analysis of any desired cell on the screen and direct and immediate access to the located objects in the object records database, without conducting a search through the database.

The schematic routing method minimizes crossovers with other edges and with object icons on the display. When crossovers with other edges cannot be avoided, or the arc gets too large, the center portion of the arc is dashed, so that the arc goes "through" or across the interceding object. This is called a broken arc, and example of which is arc 502.5 in FIG. 13.

When more than two edges are going in the same direction between the same two vertices (icons or states), they are "bundled" to minimize the space they need. Bundling means that the edges share equal portions of an unbroken arc, or of the unbroken (undashed) portions of a broken arc. Thus, bundled edges occupy a common set of cells. The number of arrowheads on an arc indicates how many edges have been bundled; for instance, arcs 503.2.1 and 503.2.2 in FIG. 6 comprise two bundled edges, representing two independent functions performed in traversing from state 503 to state 502. In this case, the functions include two events: "E: missedack" and "E: ack", respectively. These are finite state machine events, with the first being executed if arc 503.2.1 is taken, and the second being executed if arc 503.2.2 is taken.

A looped arc, it will be seen, is routed by using two arcs facing one another. Curved text associated with the edge is routed along the arc, all concentric with slightly different radii.

Figure 6:
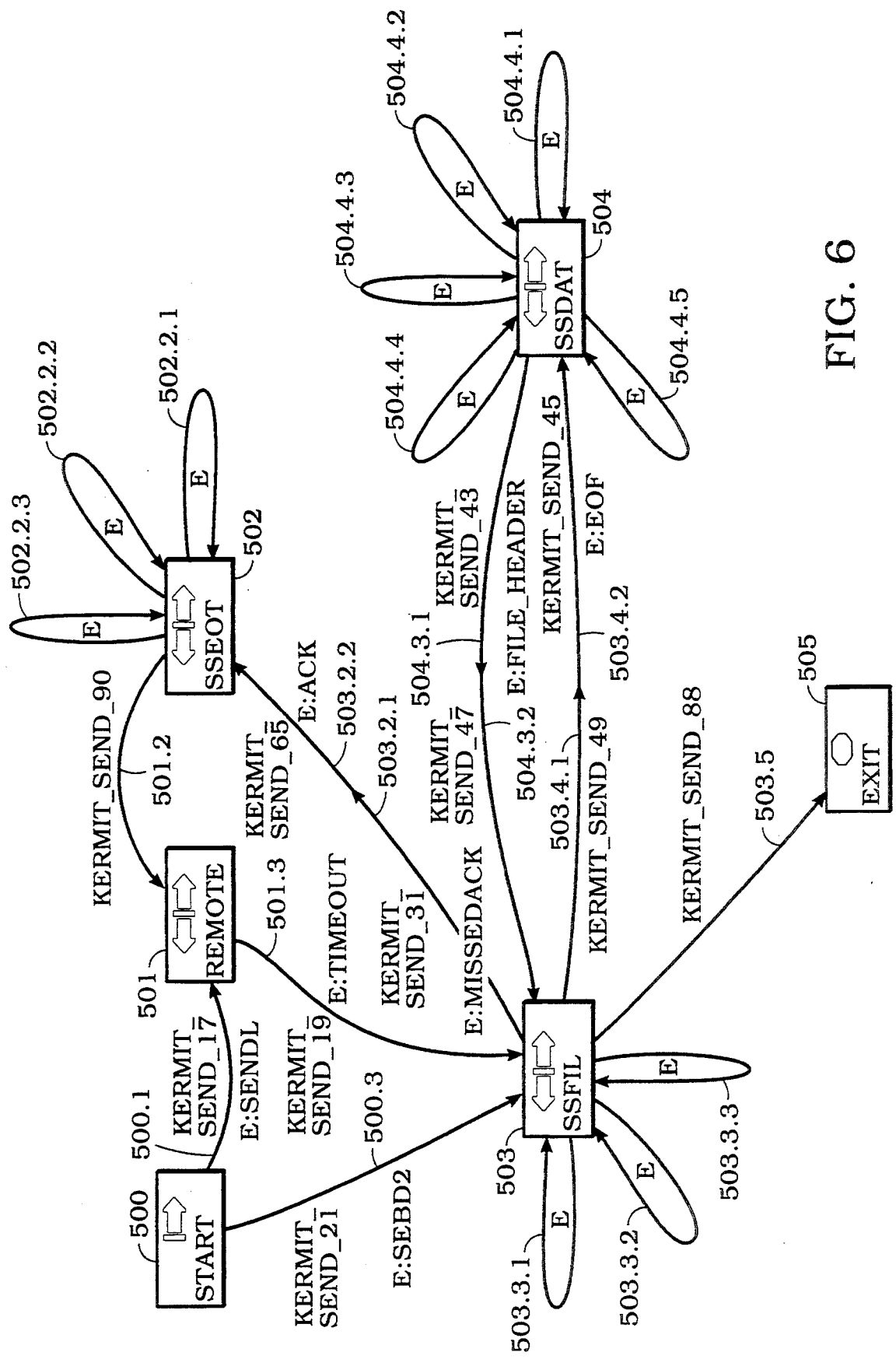
FIGS. 6-16 are representations of connected graphs illustrating the schematic routing method of the invention.

FIGS. 6-17 are state diagrams, a form of connected graph, representing finite state machines (FSMs) generated by applicant's STE application. They are representations of actual screen dumps of state diagrams generated by applicant, using STE. FIG. 6 depicts a partial model of the send protocol for the widely used "Kermit" telecommunications application, briefly described below.

There are six state icons in FIG. 6, which in FSM parlance may also be called "vertices": a start state 500, a "remote" state 501, a "sseot" (send end-of-transmission) state 502, a "ssfil" (send file) state 503, a "ssdat" (send data) state 504, and an exit state 505. The arcs that connect the states are numbered with identifiers: arc 500.1 connects state 500 to 501; arc 502.1 connects state 502 to 501 (note the arrow head, indicating functional flow, points from state 502 to state 501); arc 503.1.1 and 503.1.2 are the first and second arcs (one arc drawn with two arrowheads, indicating functionally two arcs "bundled" as one), respectively, from state 503 to state 502; and so on. This model is briefly described below.

The Kermit "send" protocol.

The send protocol depicted in FIG. 6 starts sending a message to an intended receiver of data. The events along the transitions 500.1, 500.3 (send), etc. indicate the functions being performed. Messages of acknowledgment and missed acknowledgment are shown as events "E" on transitions 503.2.1 and 503.2.2, respectively; these indicate acknowledgments received or missed from the receiving system (not shown in FIG. 6; it would be represented by another model).

The send file state 503 leads to the send data state 50, in which the protocol repeatedly sends packets of a predetermined size (e.g. 512 bytes), and for multiple packets state 503 executes one of the loops 503.3.1, 503.3.2, etc. Transition 503.4.2 corresponds to the event of the sender sending an end-of-file message to the receiver, and transition 504.3.1 corresponds to the sending of the file header. An exit state 505 is ultimately reached when a file transfer is complete.

The Kermit send protocol specifies the sending of access permissions and length of file are sent to the receiver, as well as the data packets themselves. Timeouts, end-of-files, end-of-transfers, and so on are all covered in the specification for Kermit. A complete model of the send protocol would thus include annotations on the transitions relating to all events and actions, and would define the transitions and states in detail.

As indicated above, there are looped arcs in FIG. 6, which begin and end on the same state or vertex: 502.2.1 for the first of the looped arcs beginning and ending at state 502; looped arc 502.2.2 for the second, and 502.2.3 for the third; and so on. These represent program loops. All of the arcs, looped or otherwise, represent transitions or edges where functions are carried out, assignments made, predicates tested, etc., in traversing the FSM of FIG. 6, as is standard in such FSM state diagrams.

The partial model of FIGS. 6 et seq. is used to illustrate how such a graph model is displayed, and its functions will not be discussed further. This model representation is copied from an actual screen dump of a model generated by applicants STE program. The arcs are evenly and clearly displayed with no overlaps, and with looped arcs distributed in a regular fashion about their respective state icons.

The placement and distribution of the arcs and icons in FIG. 6 was accomplished automatically by the method of the invention, as implemented in the STE program, using the procedure detailed in Appendix A. While FIG. 6 is fairly simple, so that it would not have been overly burdensome for the user to place all the arcs visually in this particular case, many state diagrams are far more complex, as are electronic circuit diagrams, CAD diagrams, and the like. The principles of the present invention are especially important for the automatic generation of connections where the architecture is highly complex.

The generation of looped arcs follows a somewhat different procedure than that for the generation of arcs that are not looped. These are discussed separately.

The arc selection and generation procedure is first described generally in Sections V.A through V.C, with reference to Appendix A. Then the application of these procedures to the actual state diagram of FIGS. 6–16 is discussed in Section V.D.

A. Schematic Routing of Normal Arcs: Selection and Generation

When an arc in an FSM, a circuit connection in an electronic schematic diagram, or some other connector between icons on a displayed connected graph is to be represented, the procedure of Appendix A is followed. As mentioned, this is tailored to generation of arcs per se, but can be adapted to generate other shapes, and use the same principles otherwise. The arc selection procedure is first described generally with reference to Appendix A, and then its application to the actual state diagram of FIGS. 6–16 is discussed in Section V.B.

The first step is to determine whether the arc connects two different icons (the states 500, 510, etc. in FIG. 6), or whether the arc represents a loop, i.e. begins and ends on the same icon. Assume one wants to draw an arc from state 502 to state 505 in FIG. 6. In this case, the vertices are different. Step 1 (i.e. line 1) of Appendix A at line 1 therefore determines that the "from_vertex" and the "to_vertex" are not equal, yielding a "false" and proceeding to step 63 (i.e. line 63).

Line 63 also yields a false, since there is no arc already going from state 502 to state 505—so there is no arc for a new arc to bundle with. The main arc generation routine begins at line 69. The nested "for" loops beginning at lines 75 and 77 try up to 400 arcs; up to 200 are tried in with "try_dir" (try direction) equal to 0, which indicates the direction the arc faces, and up to 200 are in tried facing the opposite direction (with "try_dir" equal to 1). When an acceptable arc is found, the method breaks out of the for-loops and draws the arc.

Figure 12:
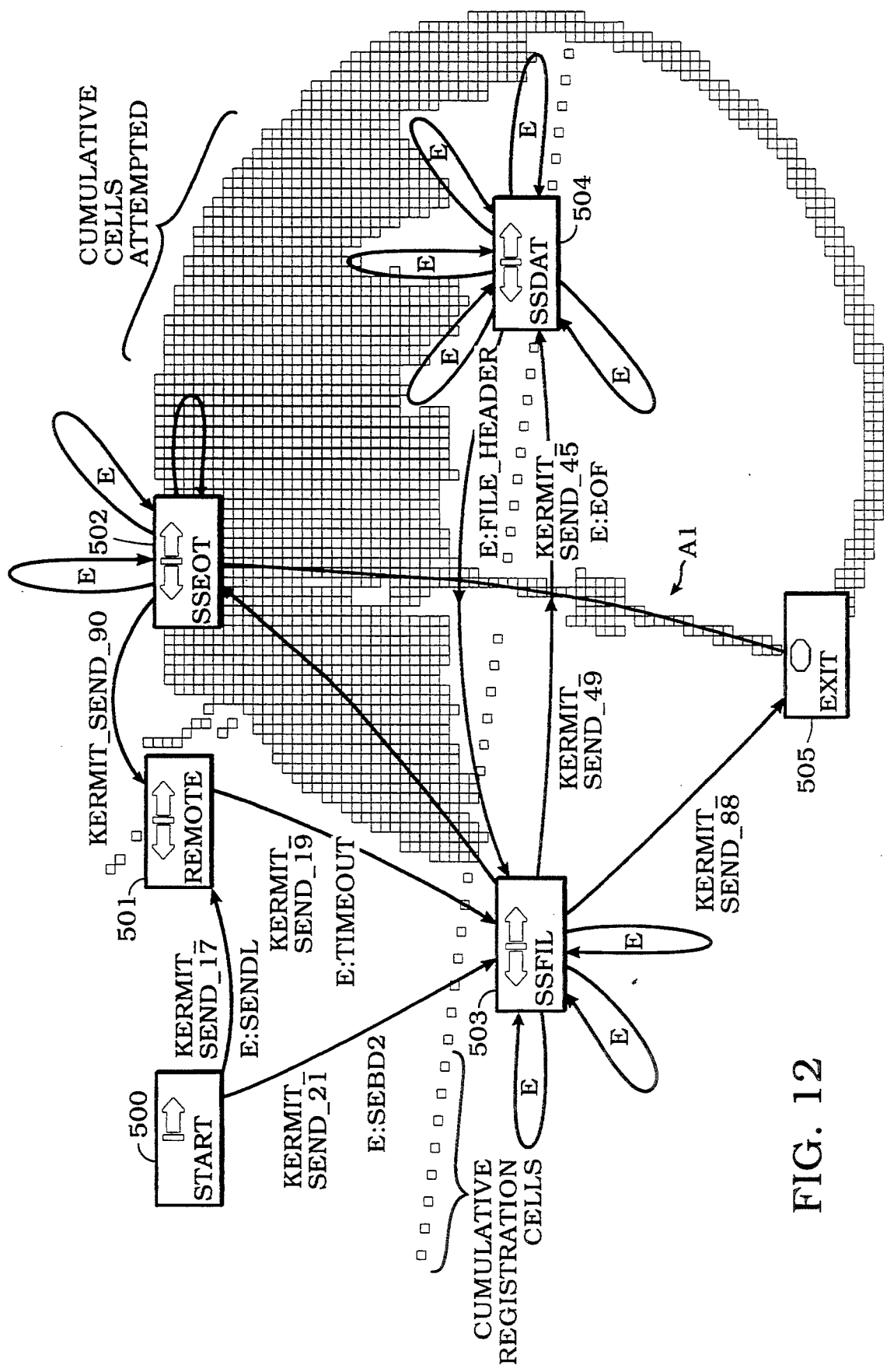
Figure 13:
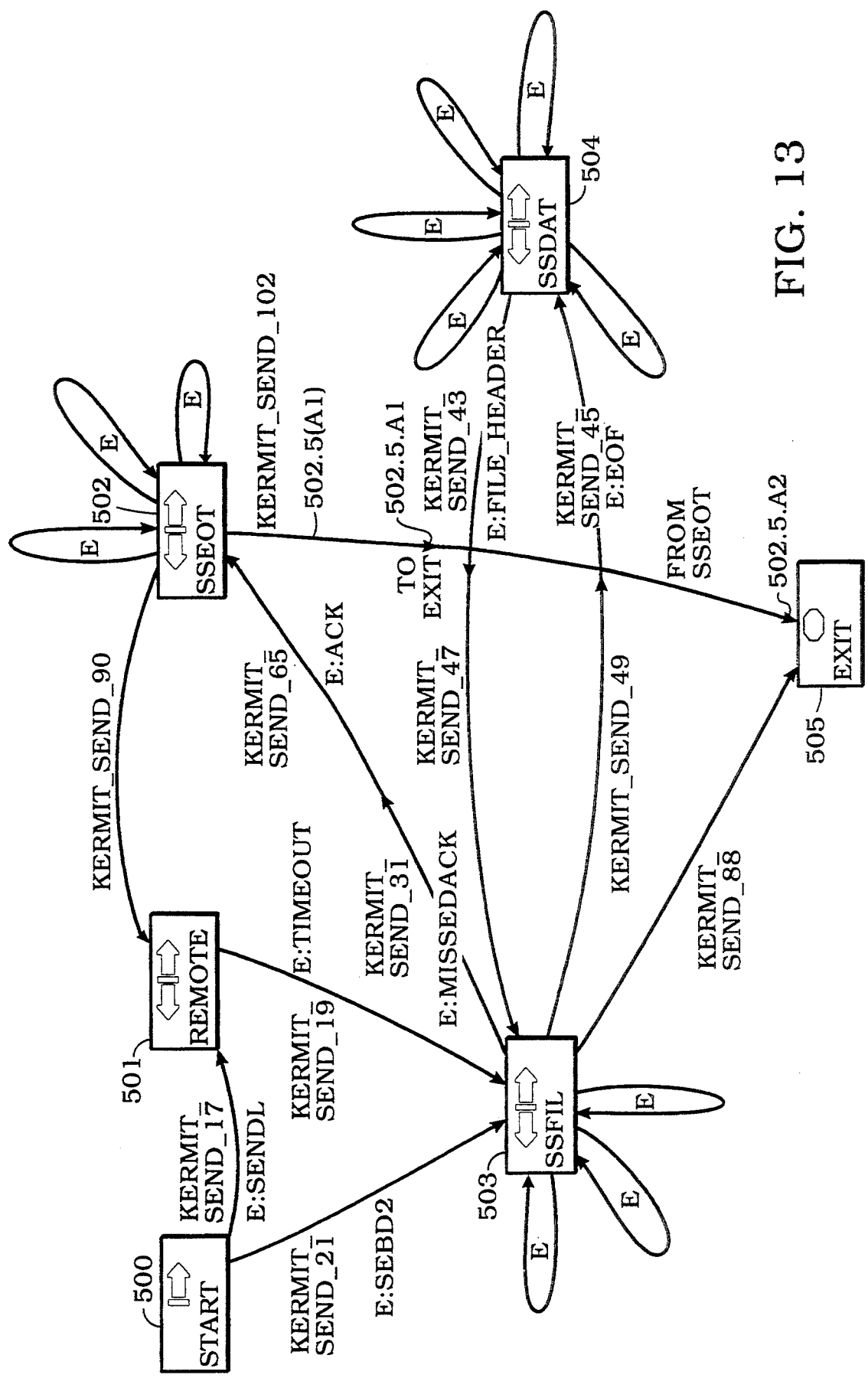

The result of drawing an arc between states 502 and 505 will be arc 502.5 shown in FIG. 13. The steps taken in generating this arc are visually represented in FIGS. 7–13.

As described at lines 80 et seq., the trial arcs (subject to the screening procedure of the method) are generated based upon the values of "try_inc" and "try_dir", which are the indices for the for-loops beginning at lines 75 and 77, respectively. First, a routine "make_arc" is called. This routine is not specifically written out in pseudocode Appendix A, but proceeds as follows.

1. The routine "make arc".

Figure 17:
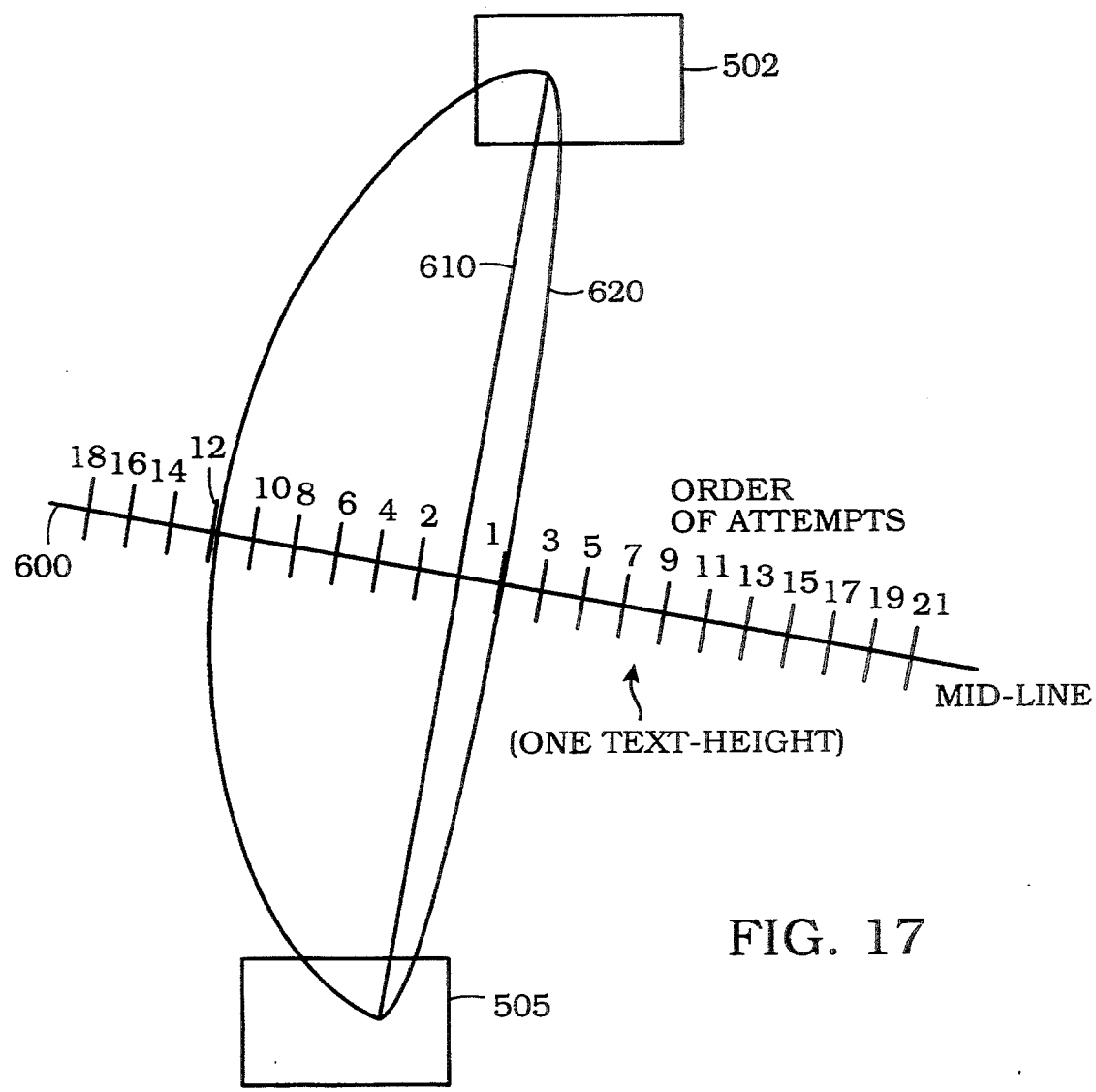
FIGS. 17-18 are diagrams illustrating arc generation procedures of the invention.

Referring to FIG. 17, the "make_arc" procedure first generates a reference line 600 extending midway between the two states, here states 502 and 505. Registration cells 1, 2, 3 etc. (appearing as tic marks on reference line 600) are identified and stored in memory. The first seven registration cells 1–7 also appear in FIG. 7. Note that they alternate in numbering: registration cell 1 is to the right of a midline 610 between states 502 and 505, registration cell 2 to the left, cell 3 to the right again and displaced from cell 1, and so on. The distance between the registration cells is selected to be large enough to accommodate the height of a line of text of the font desired, since the arc will usually have text annotated on it and sufficient room must be left for this.

Arcs are tried in an order from shallow arcs to more curved arcs; thus, the first arcs tried have the highest radius or curvature. In this embodiment, the arcs are circular (i.e. sections of a circle). The radius of each arc to be tried is a function of the index try_inc, and has an inverse relationship with it; thus, the higher the index try_inc, the lower the radius of curvature and the more bent the arc appears. Registration cell 1 in FIGS. 7 and 17, along with the center points of the states 502 and 505, define the first trial arc 620.

The following table relates the indices "try_inc" and "try_tilt" to the number of the proposed arc:

| Number of Proposed Arc | try inc | try dir |
|---|---|---|
| 1 | 0 | 0 |
| 2 | 0 | 0 |
| 3 | 1 | 1 |
| 4 | 1 | 1 |
| 5 | 0 | 2 |
| 6 | 0 | 2 |
| 7 | 1 | 3 |
| . | . | . |
| . | . | . |
| . | . | . |
| 400 | 1 | 199 |

In order to determine whether an arc will be drawn, a quick-reject scheme is first used. The registration cells are considered seven at a time. If the VMAP contains an "ste_t_i_registration_cell" for any other arc coinciding with any of these points, the first position (for trial arc 620) is rejected. See Appendix B, lines 86–90. The "ste_t_i_registration_cell" (or, just "registration cell") for the arc is defined as the cell at its midpoint. The cells in this case are 8×8 pixels, as discussed above.

Since none of the registration cells 1-7 in FIG. 17 collides with another arc's registration cell, the method proceeds to line 91, where the length and radius of the first trial arc are determined. If the length is less than some predetermined amount (here, 13 characters of text in the selected font), the arc is rejected. In addition, if the radius of curvature is greater than some predetermined amount (here, 2047 pixels), the arc is also rejected. Finally, it is rejected if its span exceeds a predetermined arc length, in this embodiment 270°.

Lines 86-90 and 93-95 of Appendix A represent quick-reject tests for the arc. The remaining portion of the arc generation procedure bases the decision about whether to accept a trial arc on the number of cells that collide with cells of other displayed objects.

At line 96, the variable "edge_collision_count" is initialized at zero. The procedure will increase this variable, depending on how many collisions are found with other objects. At lines 97-102, an arc will be flagged as "blocked" (but will not necessarily be rejected) if one of two cases arises:

(1) a vertex (i.e. an object such as a state icon) is found, and the vertex is not one of this arc's beginning or ending vertices;

(2) another edge (arc) is found, and that edge is not connected to either of the beginning vertex or ending vertex of this arc.

These collisions are determined using the respective cells linked lists discussed above.

Once lines 97-102 are complete, the only remaining edges that might be found in the way will be those that either begins or ends at the beginning or ending vertex for this new arc, i.e. at state 502 or 505 for new arc 502.5. If there is such an edge in the way, the total number of cells where the new arc would intersect with the existing arc are counted in "edge_collision_count". See lines 103-105.

At lines 106-107, the value for "edge_collision_count" is increased artificially (i.e. based upon a criterion other than actual cell collision count) by increasing its value by the value of the index "try_inc". This becomes significant as the loop procedure (the for loop beginning at line 75) goes on, and the value of try_inc approaches 199. This is to penalize long routes, which, all other things being equal (such as the number of actual collision cells), are less desirable than short routes, since they make the connected graphs more difficult to read.

2. Selecting the best unblocked arc.

Lines 108-127 contain the routine for when a proposed arc is found not to be blocked. First, the flag "try_break_flag" is set to TRUE if the proposed arc is greater than 3 time the value of the variable "text_length" (which in this embodiment is 13 characters) AND if the proposed arc would span more than 135° of arc length. Otherwise, "try_break_flag" is FALSE.

Lines 121-127 are the core of the procedure for generating an unblocked arc. At line 74, the value for "best_edge_collision_count" was initialized at infinity (preferably the highest representable value for the variable type; or it may be other very high number, higher than the highest expected collision count). At line 121, the actual edge collision count for this trial arc is compared to best_edge_collision_count, and if it is less, the steps at lines 123-127 are followed; otherwise, the method proceeds with the other try_dir value of the inner for loop (beginning at line 77); or if this has already been done, then the method proceeds with the next incrementation of the index try_inc, i.e. the next iteration of the for loop beginning at line 75.

On the first iteration, however, since best_edge_collision_count equals "infinity", line 121 returns a TRUE, and at line 123 best_edge_collision_count is set equal to edge_collision_count. Then additional variables are set at lines 124-126, representing the best arc so far as identified by the values of try_inc, try_dir, and try_break_flag, respectively. Finally, if the value for best_edge_collision_count is less than the value for try_inc, the for loop is broken out of at line 127.

These steps effectively keep track of and store the trial arc which so far has the lowest edge collision count. If an arc with no collisions is found, the first such arc is used. If no break statements are generated during execution of the forloops, they are reiterated for the full range of their indices (at total of 400 attempts), by which time the arc with the lowest number of collision counts (adjusted as described above with the "penalty" for high values of try_inc) will have bubbled to the top as the most desirable arc, and will be selected for drawing, beginning with line 155.

Some of the trial arcs may be blocked, and they are treated at lines 132, et seq.

3. Selecting the best blocked arc.

If a given trial arc is found to be blocked, i.e. it is determined that some other arc or object would be crossed by the arc if it were drawn, the arc is not necessarily rejected. Rather, the procedure of lines 132-153 is followed to determine if it is acceptable.

First, at line 134, the flag try_break is set to TRUE if the proposed arc is longer than three times text_length. Lines 137-142 remember the shortest blocked arc, just in case all subsequent attempts are also blocked. At line 137, the value of best_edge_collision_count is compared with its initial value of "infinity". If it is still at infinity, then steps 139-142 reset it to "infinity" (whatever that number was chosen to be) minus 1; then set the two variables best_inc and best_dir to the values corresponding to this proposed arc; and finally set the flag best_break_flag equal to the current value of try_break_flag.

It will be noted that the test at line 137 will be true only if best_edge_collision_count is "infinity", which would mean that the method has not yet encountered an unblocked arc (see lines 121 and 123).

There is the possibility that this first blocked arc would best not be broken, because it is shorter than 3 times the text length (e.g., 3 times thirteen characters). Then line 146 yields TRUE (if best_edge_collision_count still equals "infinity" minus 1), and then the current (blocked) arc is set to the best arc by steps 150–152.

Note that the "else" procedure of lines 130–152 stores (1) the shortest blocked arc and/or (2) the shortest blocked arc that is long enough to break. After this, best_edge_collision_count equals "infinity" minus 2, so from then on the if-tests at lines 137 and 146 yield FALSE, and this set of steps is inoperative for the rest of the execution of the for-loops beginning at lines 75 and 77.

In summary: when the routine of lines 77–157 is finished, the system has selected the best arc meeting the predetermined criteria. These include immediately rejecting any arc that is too short (less than 13 characters in length), or too long (>270°), or has too great a radius of curvature (>2047 pixels) (see lines 93–95), or does not meet the test of lines 86–90. Then, the first arc with no collisions at all or the first arc that is has fewer collisions than the index try_inc will be selected (lines 117–120, 127, and 156). If all arcs have some collisions, then the procedure sorts through and chooses the arc with the lowest collision count. If all arcs are blocked, then the shortest arc that is long enough break will be selected (lines 146–153); and if no arc is long enough to break, then simply the shortest arc is selected (lines 137–143). This last is the worst-case scenario-a blocked arc that must be broken, but doesn't meet the usual minimum length standard. It is used only as a last resort.

Note that a "collision" is considered a "block" only if the colliding object is a vertex not including the new arc's two vertices, or an edge which is not connected to either of the new arc's two vertices. See lines 97–102. Thus, and edge going to one of these two vertices may collide with the new arc, but it will not be considered to "block" it, and therefore will be treated under steps 108 et seq.

The steps of actually creating the arc selected by the procedure of steps 62–157 is set forth at lines 158–182. The make_arc procedure is called at line 159. This arc is a circular arc extending from the center of the first vertex (such as 502) to the second (such as 505). The portions of the arc that overlap the vertices (or are "under" the vertices) are clipped off, so the arc extends only to the edges of the vertices. In FIG. 17, if arc 602 is selected, the portions overlapping states 502 and 505 are clipped off, with the result appearing like arc 502.5 in FIG. 13.

If the flag "best_break_flag" became TRUE anywhere in the arc selection procedure, it is now broken at the point of blockage (see line 164), i.e. is shown in dotted fashion for some preselected region around the blocking object(s). In the preferred embodiment, one-third of the arc is shown in dotted fashion around the blockage, if possible the middle third. Line 164 calls a subroutine "ste_brk_arc", which carries out these steps.

B. Schematic Routing, of Looped Arcs: Selection and Generation

If the from-vertex and to-vertex are the same vertex for a proposed arc, that arc is a looped arc, and line 1 of Appendix A yields a positive. Then the routine at lines 4–61 is carried out to select the optimal looped arc.

At line 8, the variables "best_edge_collision_count" and "best_loop" are initialized to "infinity", which has the same meaning as discussed above.

The routine first tries an arc at 0°, which shall be taken in conventional trigonometric fashion to be the 3 o'clock position (i.e. straight to the right) of any given vertex. The actual position is not critical.

From the 0° position, initialized at line 9 of Appendix A, up two to different start angles (0° and 22.5°) are tried, with up to five looped arc lengths (dependent upon the index try_loop beginning at line 13, beginning with the shortest), and up to eight angular positions are tried, beginning with the starting angle (0° or 22.5°, as the case may be) and proceeding in 45° increments counterclockwise around the vertex. This yields a total of up to $2 \times 5 \times 8 = 80$ arcs from which to select the optimal looped arc for the situation.

At line 23, the "make-daisy" routine begins ("daisy" referring to the petaloid shape of a looped arcs). The length of the arc is a function of the index "try_loop", which goes from 1 to 5, with an index of 5 yielding the longest arcs. The trial position of the arc is a function of the index "try_degree".

At lines 25–28, the position of the ste_t_i_registration_cell (i.e. registration cell) for each proposed arc is inspected to ensure that it does not overlap another registration cell for a looped arc of the current vertex. Otherwise, on arc might lie directly on top of another. If there is such overlap, the proposed looped arc is immediately rejected, and the method proceeds to the next increment of the for-loop.

At line 29, "edge_collision_count" is initialized to zero. Then the method inspects each cell in the VMAP corresponding to the cells that would be occupied by the proposed looped arc. The arc is immediately rejected if there is any overlap with a vertex (state) different from this looped arc's vertex; or with another looped arc that is not from this arc's vertex; or with any edge that does not come from or go to this arc's vertex. Note that looped arcs of this proposed arc's vertex are not considered as colliding with the proposed arc (see line 49), unless their registration cells actually would collide, i.e. they would be of identical size and at the same angle with respect to the vertex.

After eliminating these conflicts, the only edges left with which the proposed looped arc might collide will be edges that are not looped, and that begin or end on this vertex. A collision count is made for each proposed looped arc with such other edges, and the arc with the lowest count is selected for drawing and storing with the state diagram. If any arc is found with zero collisions, that arc is selected immediately, and the selection process is terminated; the method proceeds then to line 158 to generate and store the arc. See lines 39–40.

At line 41, if the variable "edge_collision_count" for the currently proposed arc is less than the best edge collision count found so far, or if these two count are equal and "try_loop" is less than "best_loop" so far, then steps 45–48 select this arc as the best arc found so far. The latter case could happen if, for instance, "best_loop" had a value of 3 for a "start_degree" of 0°, and when start_degree was set to 22.5°, an equally good arc (in terms of collision count) was found but at a lower value of the index "try_loop", indicating a smaller length for the arc. Since, other things being equal, a smaller arc is preferable, it is selected even though the collision counts are equal.

Otherwise, the arc with the lowest collision count so far is selected. If at any point an arc with zero collision count is found, the process breaks out of the for loops, so the current "best" arc is the finally selected looped arc.

The routine "make_daisy" is called next, at line 56 (though not explicitly set out in pseudocode). This is a procedure for actually generating the arc object according to the specifications determined by the selection procedure. The angle at which the arc will be drawn relative to the vertex (with 0° at 3 o'clock, 90° at 12 o'clock, etc.) is determined by the final value of "best_degree", namely some value 0°, 22.5°, 45°, up to 335°. This makes for sixteen possible angles for the loop.

The length of the looped arc is determined by the final value of "best_loop"; the lower the value, the smaller the arc.

Figure 18:
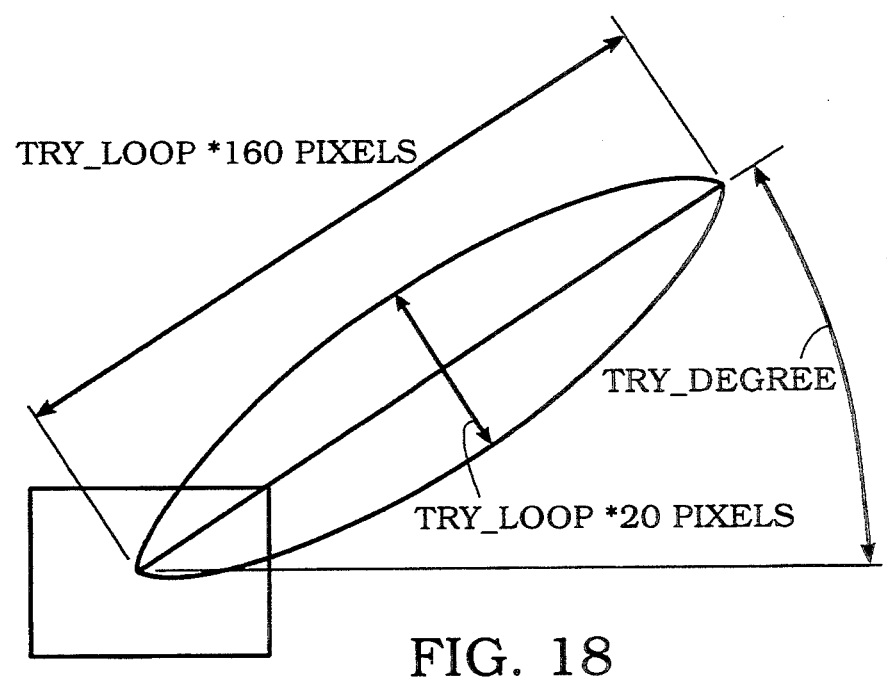

FIG. 18 illustrates the generation of a looped arc. The length is best_loop times 160 pixels (and for any given proposed arc, the length is try_loop times 160 pixels). The width of the loop is best_loop (or try_loop) times 20 pixels. Other dimensions may be chosen, but it is preferable that for larger values of try_loop and best_loop, greater lengths and widths for the loops be used.

The angle try_degree (or best_degree) is also shown in FIG. 18. The starting and ending points for the two arc sections that make up the looped arc are preferably positioned at the center of the connected state. Once the arc is generated, the portion overlapping with its connected state is clipped. Given these features, it is a straightforward matter to generate code to create the looped arcs.

C. Finalizing the Selected Arc

The procedure at lines 167-182 is applied to the arc just selected and generated, whether a normal arc or a looped arc.

At line 167, a routine "ste_mke_head" is invoked to add an arrowhead, such as arrowhead 502.5.A1 at the end of the arc adjacent the to-vertex (here, vertex 505; see FIG. 13). The arrowhead may be formed in any conventional fashion for drawing an arrowhead and linking it with the arc. If the arc is broken, as in FIG. 13, and extra arrowhead 502.5.A2 may be placed at the point of the break. For a looped arc, an arrowhead such as arrowhead 502.2.1A is placed at one end of the loop.

At line 170, the arc is now stored in the object records database 60. At this point, also, when the arc is stored the active cells that are associated with it are generated and stored. This is covered in Section V below.

Text is placed along a normal (non-looped) arc as in steps 171-173; up to four lines of text are accommodated, though more or fewer may be selected. If more are selected, then correspondingly more registration cells surrounding the arc should be added to ensure that there is sufficient room for the text.

For a looped arc, the text is placed inside the loop as in FIG. 6, the "E" in these cases signifying events that take place on those loops in the Kermit model. Other letters (up to five in this embodiment) may be placed, such as "A" for an action, "P" for a predicate, "T" for test information (for testing the FSM), and "C" for a constraint on the execution of the model. The placement and amount of text can be varied.

The arc is then drawn according to a drawing routine, which may be conventional and which in this case is referred to as "RedrawArc ()".

Figure 14:
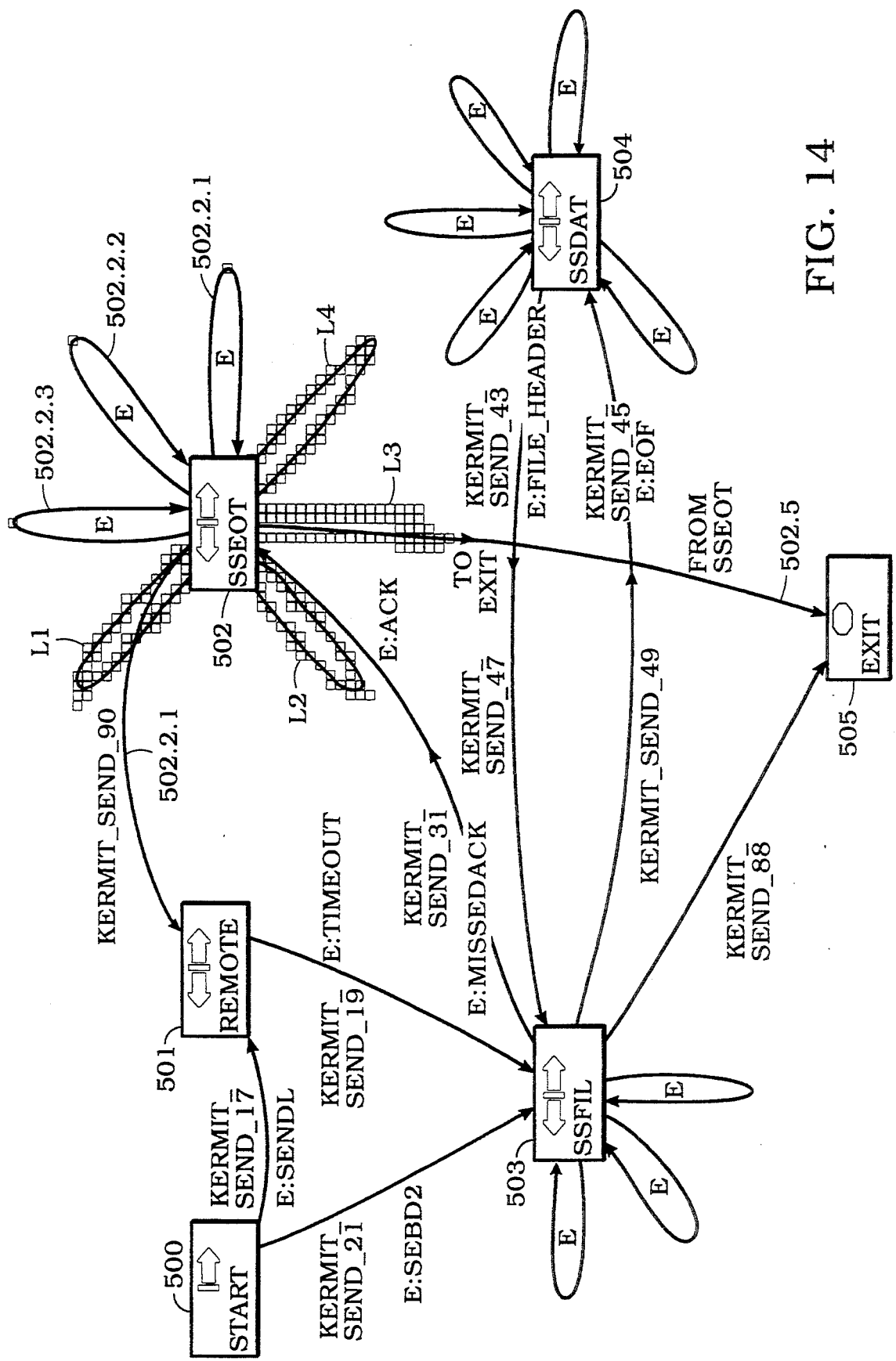
Figure 15:
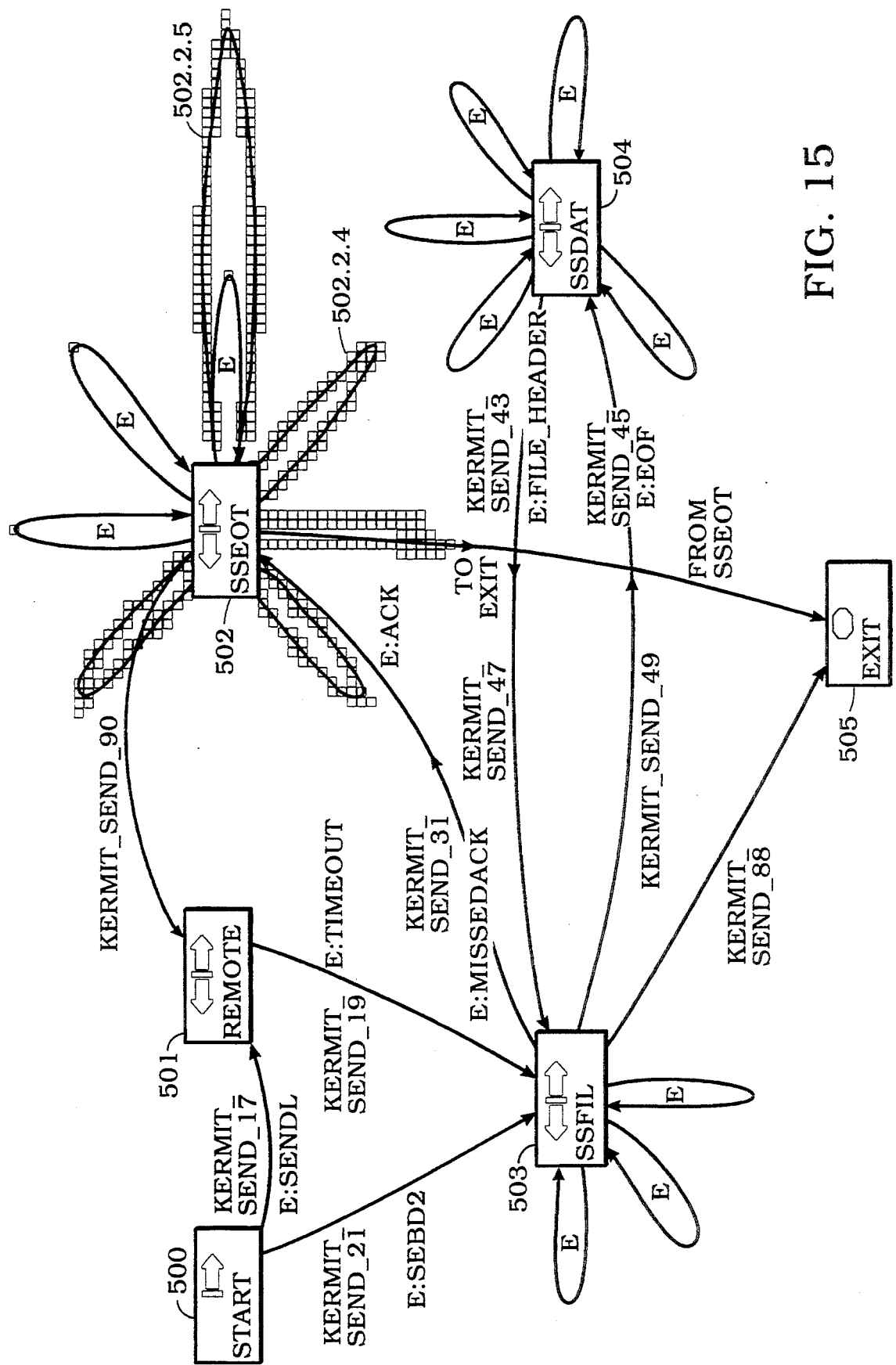
Figure 16:
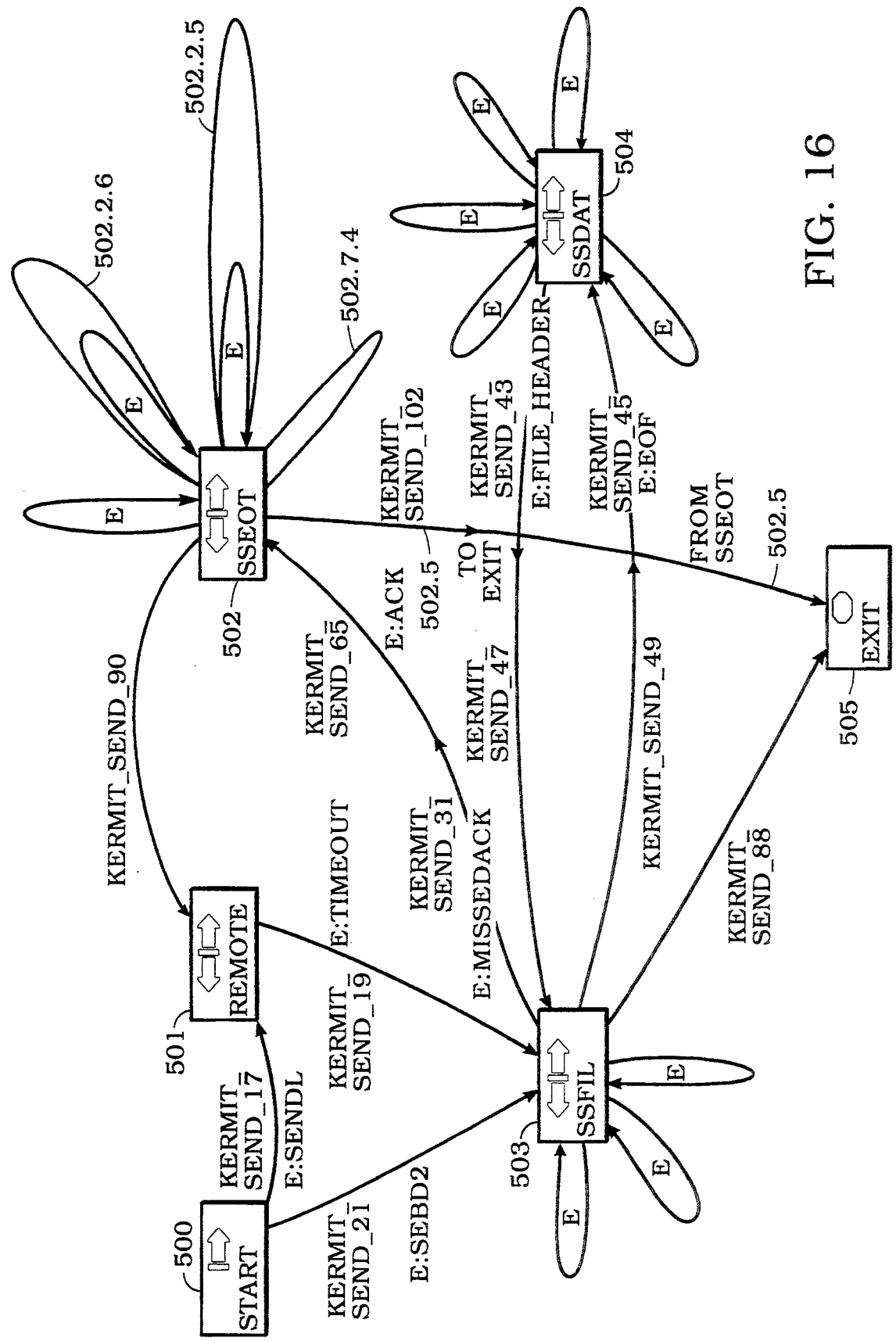

D. Schematic Routing Example for a Finite State Machine Mode;

FIGS. 6 is a state diagram to which, for the example, we would like to add arcs: one normal arc extending from vertex 502 to vertex 505, and three looped arcs on vertex 502. FIGS. 7-13 show the addition of the normal arc 502.5, and FIGS. 14-16 show the addition of new looped arcs 502.2.4, 502.2.5 and 502.2.6. FIGS. 7-13 are derived from actual screen dumps generated by applicant's STE application, with some simplification for clarity.

1. Adding a normal edge.

Figure 7:
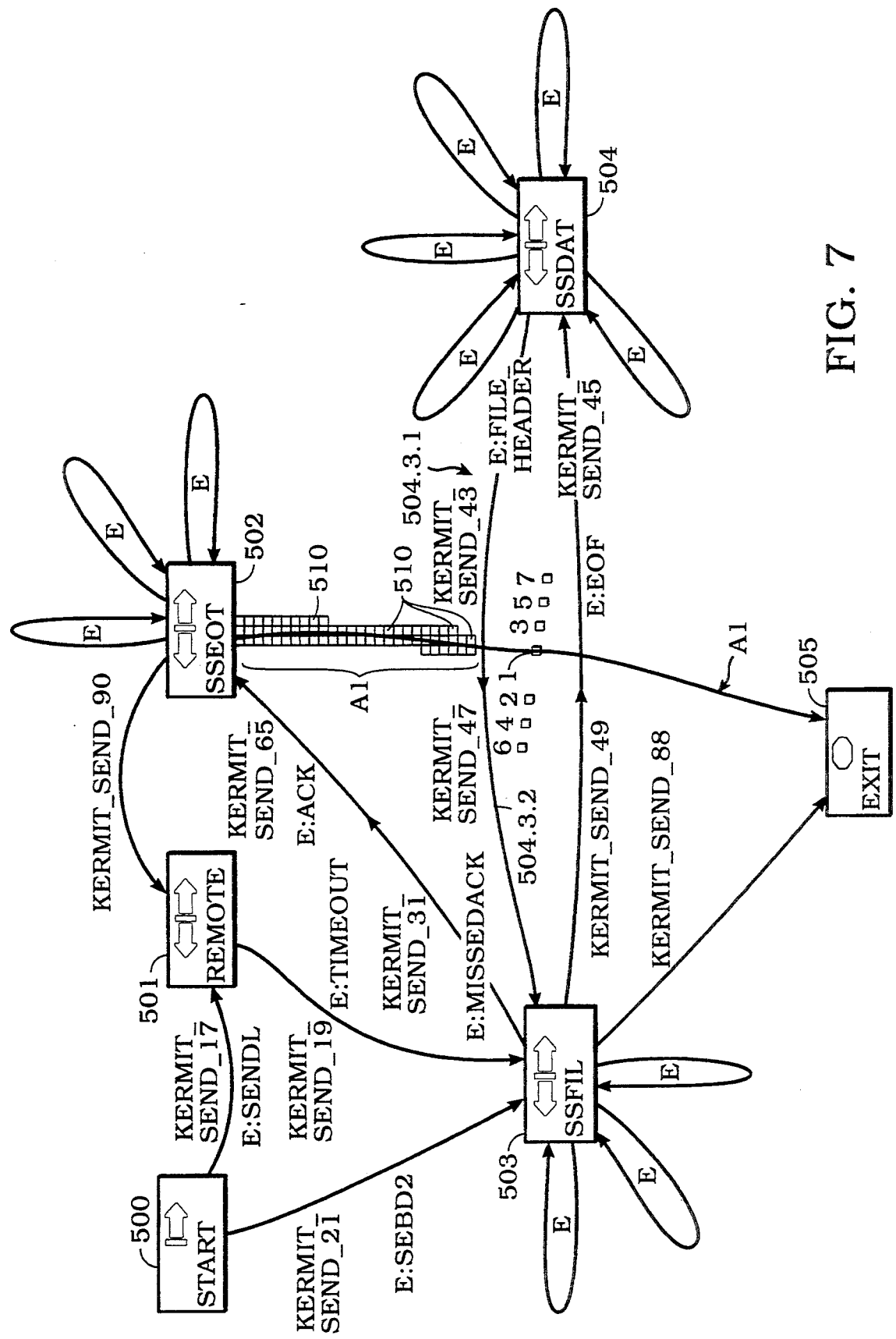

In FIG. 7, the registration cells 1-7 (reserving space for annotated text) for the first proposed arc A1 are generated and inspected. There are no collisions, so this arc is not rejected at this point. See Appendix A, lines 86-90. The arc meets the minimum length test of line 92, and is not rejected by the tests of lines 93-95.

The arc A1 is found to be blocked, because some of its cells overlap an edge not associated with either vertex 502 or 505, i.e. edge 504.3.1 (at the arrowhead of the edge). See FIG. 7 and lines 97-102. The cells 510 surrounding the proposed arc in FIG. 7 (and obscuring it) are generated by the procedure discussed in Section IV above.

Once the collision count for the first arc A1 is made (at steps 97-102) and incremented (at step 107), method proceeds to step 130, and since this first arc is blocked, it becomes the best arc to date under both procedures at steps 135-143 and 144-152. At the end of this, best_edge_collision_count will be equal to "infinity" minus 2, so none of these steps will executed again for this particular arc generation. (When a new arc is to be generated, the value for the variable "best_edge_collision_count" is reset to "infinity".)

Next, a second proposed arc A2 is tried. Note that it opposes arc A2 (see FIG. 8), because the value for "try_dir" has gone from 0 to 1 (see line 77). In this embodiment, all arcs tried when "try_dir" equals 0 are concave to the left, and those tried when "try_dit" equals 1 are concave to the right.

Figure 8:
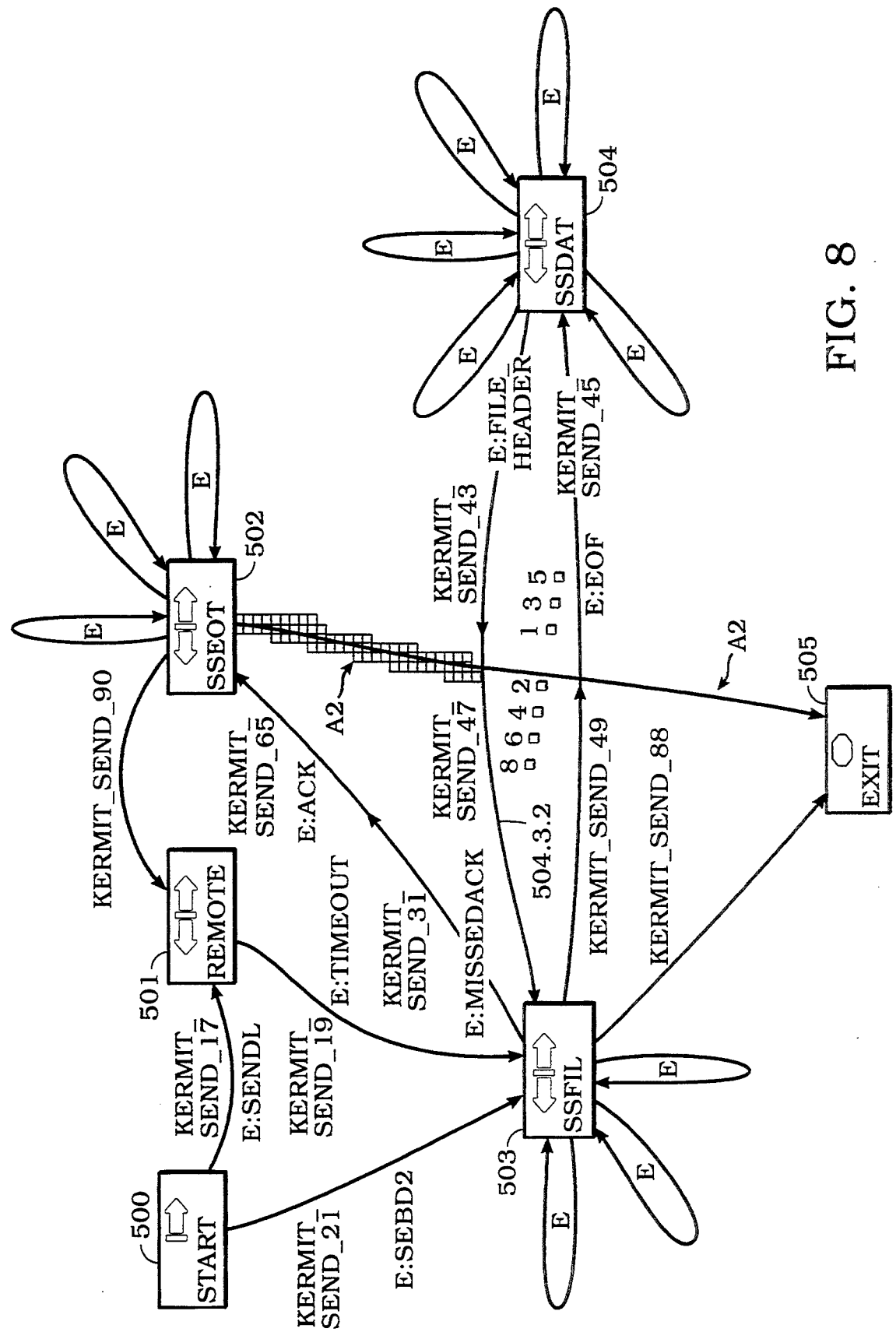
Figure 9:
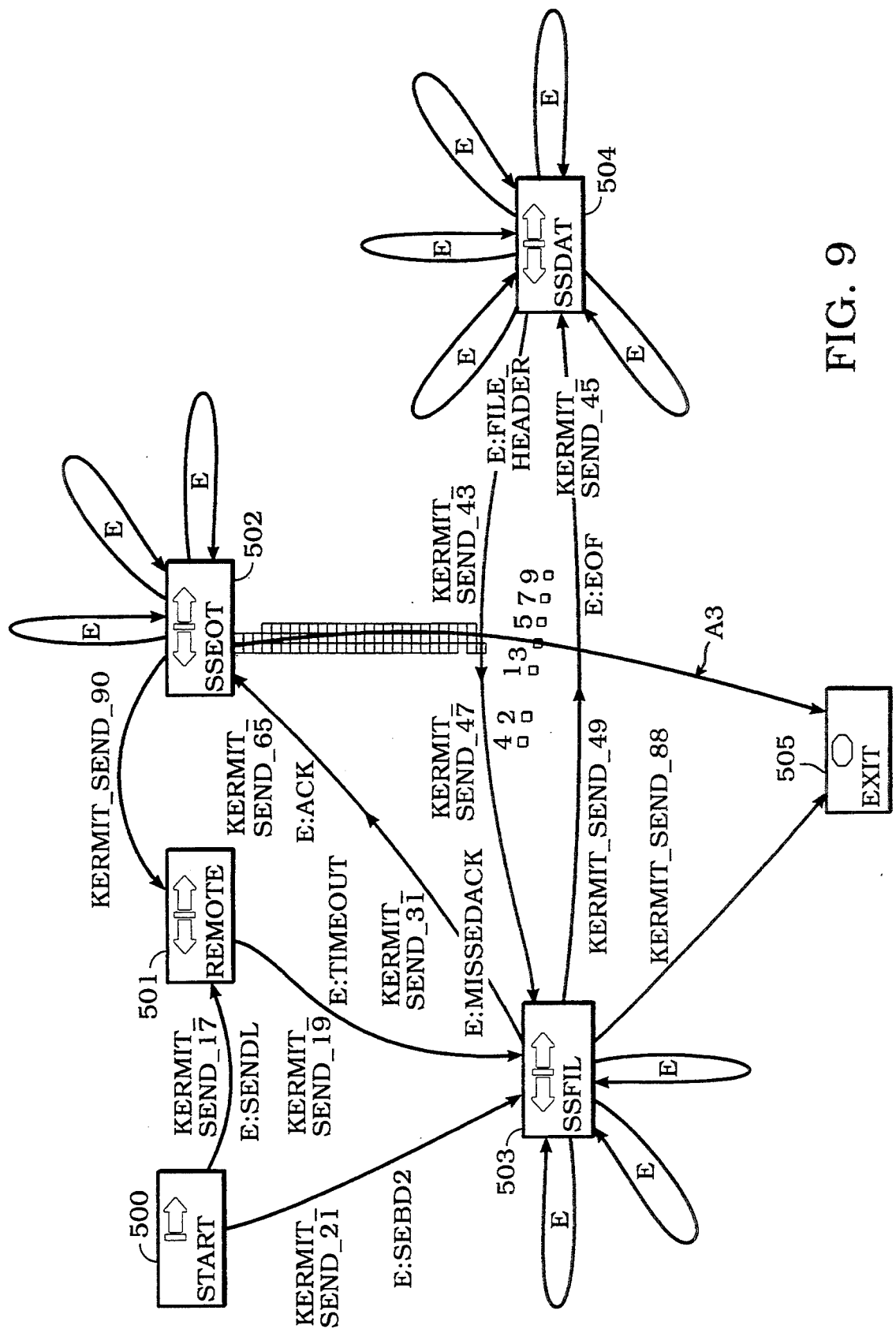

Arc A2's registration cells 1-6 and 8 do not have any collisions, so it passes muster under lines 86-90, as well as under lines 93-95. Arc A2 is found at lines 97-102 to be blocked, so ultimately this arc is rejected, and arc A1 remains as the best arc so far. FIG. 8 shows the cells of proposed arc A2 up to the blockage point.

Proposed arc A3 is no better than A2, and it is blocked, too, so it is rejected. See FIG. 9 for proposed arc A3 (including its cells up to the blockage point). A1 remains the best arc so far.

Figure 10:
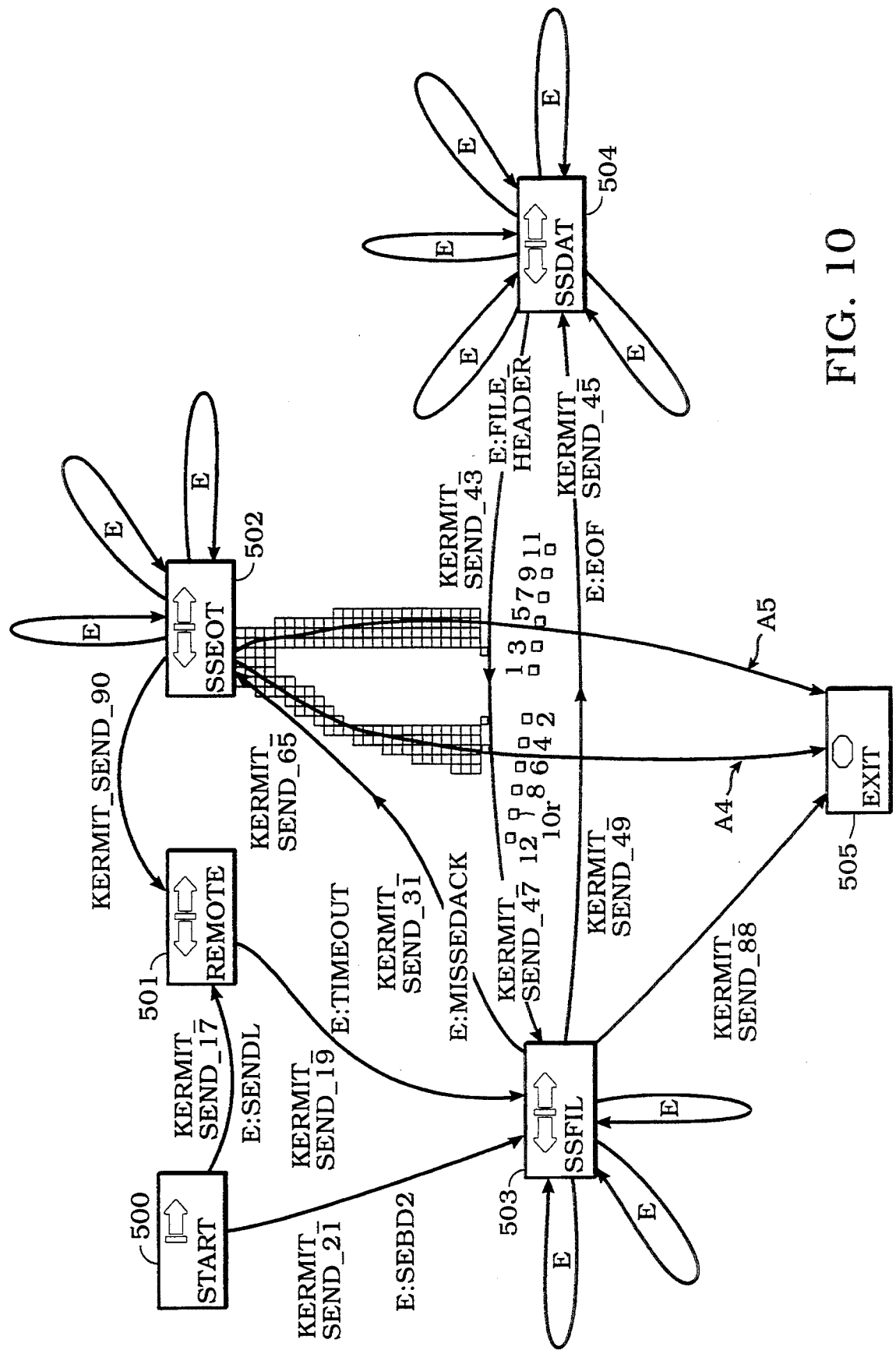

Proposed arcs A4 and A5 are both shown in FIG. 10. Registration cells 1, 2, 4, 6, 8, 10R and 12 apply to arc A4, and registration cells 1-3, 5, 7, 9 and 11 apply to arc A5 (as usual, seven registration cells in each case, corresponding to two lines of text on each side of the proposed arc). Arcs A4 and A5 are still blocked (though not rejected on account of their registration cells, which are still in the clear), and they are longer than previous blocked arcs; they are rejected.

Figure 11:
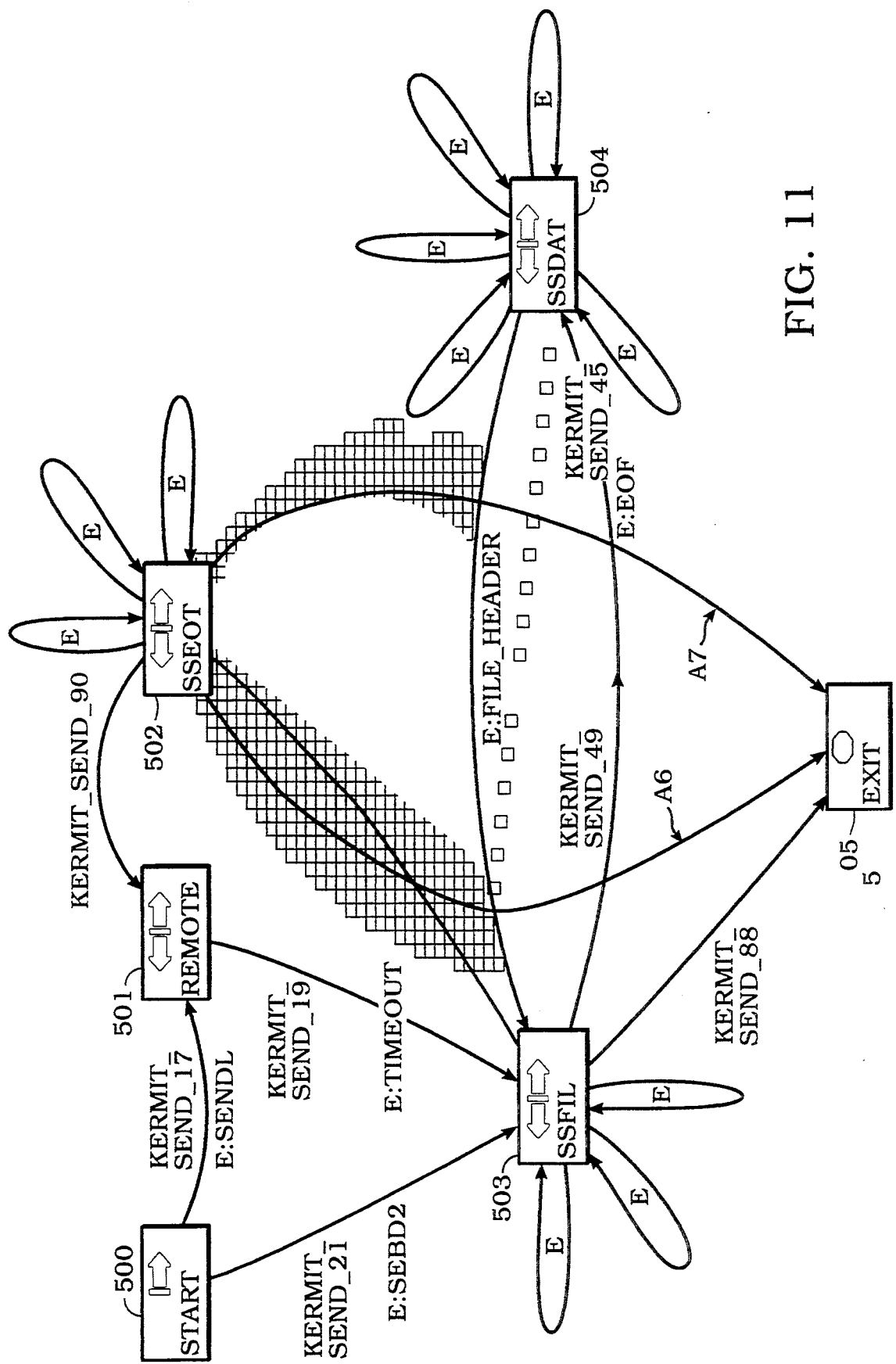

Subsequent proposed arcs A6 and A7 (several arcs later) are shown in FIG. 11. Arc A6 has collisions with edges 503.2.1 and 503.2.2 (compare FIG. 11 with FIG.

6). These edges are associated with vertex 502, so arc A6 is not rejected on this basis alone; but the collision increases the collision count considerably, besides which this arc is blocked. It is rejected, as it arc A7.

Finally, in FIG. 12, an unblocked arc A8 is proposed. (The registration cells traversing the middle of the figure correspond to all the arcs that have been tried so far; most were both blocked and had high collision counts.) Since arc A8 is not blocked, the procedure at lines 108-127 are followed; however, the arc is rejected at lines 113-114, because its arc length is greater than 135°.

Once the procedure of Appendix A is complete for the attempted edge between states 502 and 505, the best arc turns out to be the first one tried, even though it was blocked. Thus, at FIGS. 12 and 13, arc A1 is drawn and becomes edge 502.5.

It will be appreciated that edges such as 500.3 and 501.3 were selected the first time they were tried: there were no blockages, and the collision counts were zero. It is when the connected graph becomes more complicated that the schematic routing of the invention becomes most important in ensuring clarity of the diagram.

2. Adding a looped arc.

FIGS. 10-12 illustrate the addition of new looped arcs to state 502 (compare FIG. 6). The procedure of steps 3-61 in Appendix A is followed. The first proposed looped arc would be exactly coincident with loop 502.2.1, and so is rejected, based upon the registration cells coinciding. See lines 24-28. Proposed arcs at the positions of loops 502.2.2 and 502.2.3 are rejected for the same reason.

A proposed looped arc L1 is shown with its cells, and collides with edge 502.1. It is not rejected, but the (non-zero) edge collision count is made at steps 41-49. It is the first proposed arc not rejected.

An arc cannot be drawn at the 9 o'clock position on state 502, because it would collide with state 501; it is rejected at step 33.

Proposed arc L2 collides with edge 503.2.2, but is not rejected; however, its collision count is higher than that for arc L1, so it is not saved. Arc L3 is likewise not saved.

Arc L4 is the first proposed arc with no collisions. According to lines 39-47, it is accepted, and lines 48, 51 and 53 break out of the for-loops, so the method proceeds to step 167 to draw this new looped arc 502.2.4, as shown in FIG. 16.

Similar processing is carried out to select and generated looped arcs 502.2.5 and 502.2.6 (see FIGS. 16 and 17). For loop 502.2.5, eight arcs are proposed: the same seven as in the processing of loop 502.2., plus an eighth, i.e. a proposed arc which would lie atop loop 502.2.4 (and is for that reason rejected). Thus, loop 502.2.5 represents the ninth attempt to draw that loop. It is longer than loop 502.2.4, because it was generated using a value for "try_loop" of 2, since the eight attempts when "try_loop" equaled 1 did not succeed.

Looped arc 502.2.6 thus represents the tenth proposed arc; the nine leading up to arc 502.2.5, plus one more. It will be understood now that, although up to 80 arc position and size combinations are available, given the three for-loops beginning at steps 9-19, in a complicated graph many combinations may not be available. The positions and sizes combinations can be changed, and increased in number, by manipulation of these for-loops.

The creation of a model such as that of FIG. 16 is quite fast, ensured by the constant maintenance and updating of the VMAP with its cell maps and linked lists. To create a model, the user selects a state such as an entry state 500, an intermediate state 501-504, or an exit state 505 (other possibilities may be available), and clicks where he or she wants the state to appear. The state is then preferably positioned "snapped to" (i.e. aligned with) the nearest VMAP cell to the location of the click. Another state, such as state 501, is also selected and created where the user clicks. Then the user issues a keyboard or mouse command to connect the two states by an edge, which the system carries out automatically by the above procedure, the result being edge 500.1.

All subsequent states and edges are created in the same fashion. Each time, the system of the invention generates the optimal connection between state icons very quickly: generally in less than a second.

The states may be moved around once they are generated. Using the linked lists in the VRAM region of memory, all edges connected to a state that is moved are automatically moved with it, so the user never has to manually reroute the schematic diagram. For instance, if the user really wanted an unblocked edge to be available between states 502 and 505, he or she could simply move state 504 to the left and state 502 to the right, so that the proposed arc A8 (see FIG. 12) would no longer span more than 135°, and that arc would succeed with a collision count of zero. When states 502 and 505 are moved as described, all their connected edges are moved and reshaped as necessary.

Appendix A

Pseudocode for Arc Generation

```
if (from_vertex EQ to_vertex)
{
    /*Routing a looped arc.*/

/*Up to 80 looped arcs are attempted, at 5 growing lengths
    relative to "try_loop", at 8 different angles "try_degree"
    45 degrees apart, relative to a "start_degree" of first 0,
    then 22.5:*/ best_edge_collision_count = best_loop = INFINITY;
```

```
for (start_degree = 0.0;
     start_degree < 44.0;
     start_degree += 22.5)
{
  for (try_loop = 1;
       try_loop <= 5;
       try_loop++)
  {
    for (try_degree = start_degree;
         try_degree < 359.0;
         try_degree += 45.0)
    {
        /* A looped arc is created on a trial basis, as a function
        of "try_loop" and "try_degree": */ make_daisy(try_loop, try_degree);

/*(A "daisy" is a looped arc, from the petaloid shape.)*/
        An attempt to route a looped arc is quickly rejected if
        the VMAP contains a ste_t_i_registration_cell for
        an existing looped arc at this looped arc's tip (prevents
        overlapping daisies).

edge_collision_count = 0;

Each cell in the VMAP at the shape of the looped arc is
        inspected
        An attempt is rejected if we find:
        - a vertex different than this looped arc's vertex, OR
        - another looped arc not from and to this arc's vertex, OR
        - another edge not associated with this vertex.

/*Any other edge found will be a non-looped arc that begins
        or end at this vertex.  Those VMAP cells are counted in
        "edge_collision_count", and the looped arc with the lowest
            count so far is remembered.  If a count of zero is found,
            we stop the attempts immediately and use that looped arc:*/ if (edge_collision_count < best_edge_collision_count OR
                (edge_collision_count == best_edge_collision_count AND
                  try_loop < best_loop))
            {
                best_edge_collision_count = edge_collision_count;
                best_loop = try_loop;
                best_degree = try_degree;
                if (best_edge_collision_count == 0) break;
            } /* Note: loops of this vertex are not "collisions." */

}
        if (best_edge_collision_count == 0) break;
    }
    if (best_edge_collision_count == 0) break;
  }

Create the best arc:

make_daisy(best_loop, best_degree);

Clip away the portion of the arc under the vertex:

ste_clp_arcs();
}
else
{
```

/*Routing a normal arc.*/

```
If this edge is to become a new member of a bundle
{
    Add new member to bundle
}
else
{

/*To route an edge between the two vertices, up to 400
    arcs are attempted.  The first arc is almost a straight
    line (large radius).  The next arc attempted will bend
    the other way and have a slightly smaller radius and
    so on until we find an open area or are forced to stop.*/ best_edge_collision_count = INFINITY;

for (try_inc = 0; try_inc LE 199; try_inc++)
    {
      for (try_dir = 0; try_dir LE 1; try_dir++)
      {
        /*The value of "try_dir" indicates direction of bending.*/

An arc is created on a trial basis, as a function
        of "try_inc" and "try_dir".  Each attempt of bending
        a certain direction is made two text heights away from
        the previous attempt bending the same way, measured at
        the midpoint of the arc-span.

make_arc(try_inc, try_dir);

An attempt to route an arc is quickly rejected if
        the VMAP contains a ste_t_i_registration_cell for
        an existing arc within 4 text-line heights from this
        arc's mid-point (prevents overlapping arcs and leaves
        room for text).

Find length and radius of arc.

text_length = length_needed_for_13_characters;

If length of arc is less than text_length, reject attempt.
        If radius of arc is greater than 2047 pixels, reject attempt.
        If the span of the arc exceeds 270 degrees, stop the attempts.

edge_collision_count = 0;

Each cell in the VMAP at the shape of the arc is inspected.
        An attempt is considered blocked (but not rejected) if we
        find:
        - a vertex different than this edge's two vertices, or
        - another edge not associated with either of this edge's
          two vertices.

/*Any other edge found will be one that begins or end at
        one or two of this edge's two vertices.  Those VMAP
        cells are counted in "edge_collision_count".*/

Penalize all routes (notably, long routes) by:

edge_collision_count += try_inc;

if (not blocked)
             /* This portion generates an arc that is not
             blocked.*/
```

```
{
    Set try_break_flag to indicate if arc is to be broken:

try_break_flag = arc is longer than 3*text_length and
                    spans more than 135 degrees;

/* An arc is broken if it is very long or spans a large
       arc length. */
    The arc with the lowest "edge_collision_count" so far
    is remembered.  If an edge_collision_count of zero
    is found, we stop the attempts immediately and use that
    arc:

if (edge_collision_count < best_edge_collision_count)
    {
        best_edge_collision_count = edge_collision_count;
        best_inc = try_inc;
        best_dir = try_dir;
        best_break_flag = try_break_flag;
        if (best_edge_collision_count <= try_inc) break;
    }
}
else   /* (arc is blocked) */
{
    */ Set try_break_flag to indicate whether the arc is to be
       broken: */ try_break_flag = arc is longer than 3*text_length;

/*Remember shortest blocked arc in case all attempts are
    blocked:*/ if (best_edge_collision_count EQ INFINITY)
    {
        best_edge_collision_count = INFINITY-1;
        best_inc = try_inc;
        best_dir = try_dir;
        best_break_flag = try_break_flag;
    }

/*Remember shortest blocked arc that is long enough to
    break in case all attempts are blocked:*/ if (best_edge_collision_count EQ INFINITY-1 AND
        try_break_flag)
    {
        best_edge_collision_count = INFINITY-2;
        best_inc = try_inc;
        best_dir = try_dir;
        best_break_flag = try_break_flag;
    }
}

} /* End for (try_dir) */ if (best_edge_collision_count <= try_inc) break;

} /* End for (try_inc */
Create the best arc:
make_arc(best_inc, best_dir);
Clip away the portion of the arc under the vertices:

ste_clp_arcs();

If the best arc needs to be broken, break it.
```

```
        if (best_break_flag)
            ste_brk_arc();
    }
}
```

Make the arrowheads: /* Following routine is for all arcs: */
ste_mke_head();

Store the final edge in the VMAP:
ste_map_trans();

Place the text along the arc(s). Up to 4 text lines for normal edges, in this order:

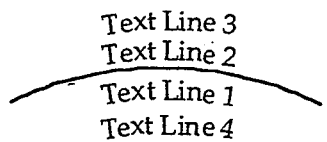

For looped arcs, up to 5 characters are placed at the number 2 position of one of the arcs (inside the looped arc), like this:

Draw the edge with the text in the window and the backing-store, and update the objects database.

RedrawArc();

}

Appendix B

Generation of Active Cells for Arcs

Definition: The set of cells in the Vmap that belongs to an arc
(i.e. are close enough) is the arc's raster set, namely the arc's active cells.

Use: When a route-attempt is done, and an arc is tried, that arc's raster set in the Vmap is used to look for obstacles. When a winning route-try is selected, the arc's raster set in the Vmap to point through the linked-list to the arcs data structure in the main database.

Method:

```
    ste_arctol    = 0.00001;              !Floating-point fault tolerance;
    dr            = radius of arc;
    dwid          = width of arc (e.g. 2.0 pixels);
    off_wid       = dwid * 0.5;
```

```
pixels_per_cell = e.g. 8.0 pixels;
off_arc         = pixels_per_cell / sqrt(2.0);
off_arc         = ste_arctol + MAX(off_wid, off_arc);
inner_rad       = dr - off_arc;
outer_rad       = dr + off_arc;

for (each cell in the enclosing box of the arc)
{
    find the polar coordinates of the midpoint of the cell
    (theta, cell-radius) relative to the center point of the arc.

if (theta is between the begin and end angle of the arc)
    {
        find distance DIST between center point of arc and
        center point of cell.

if (inner_rad < DIST < outer_rad)
        {
            cell is part of the raster set.
        }
    }
}
```

We claim:

1. A method for generating a graphical connector to form a connection between a first location on a first vertex object and a second location on one of the first vertex object or a second vertex object, the vertex objects being displayed on a monitor controlled by a computer, the computer including a memory storing an object records database and a software application mapping the monitor onto an array of cells, each cell corresponding to a predetermined number of pixels, the method including the steps of:

(1) generating a first proposed connector having a first length and corresponding to the first position on the monitor, the first proposed connector extending from the first location to the second location;

(2) for each cell corresponding to the first position, determining whether that cell is a collision cell corresponding to a position of a colliding object stored in the database, and if so, assigning a value to a collision count, the value depending upon the total number of cells that are collision cells;

(3) if the collision count for the first position is zero, then storing the first proposed connector as the best connector and proceeding to step 9;

(4) generating an new proposed connector corresponding to a new position on the monitor and extending from the first location to the second location;

(5) for each cell corresponding to the new position, determining whether that cell is a collision cell corresponding to a position of an object stored in the database, and if so, assigning a value to a new collision count, the value depending upon the total number of cells that are collision cells;

(6) if the new collision count for the new position is zero, then storing the new proposed connector as the best connector and proceeding to step 9;

(7) if the new collision count for the new position is nonzero, maintaining a best collision count record of the proposed position having the lowest collision count of all proposed positions generated so far and storing the corresponding connector with the lowest collision count as the best connector, and returning to step 4;

(8) repeating steps 4 through 7 until at least one predetermined break criterion is met, and then proceeding to step 9; and (9) storing the cells of the best connector in said memory.

2. The method of claim 1, wherein the colliding object is an object other than the first vertex object and the second vertex object.

3. The method of claim 1, wherein the first and second location are both on the first object, the method further including, after each of steps 1 and 4 and before steps 2 and 5, respectively, the steps of:
   for each of a predetermined number of registration cells, determining whether the registration cell corresponds to a position of one of a predefined group of objects, and if so, rejecting the proposed connector and proceeding to step 4.

4. The method of claim 3, wherein the predetermined group of objects includes another connector to and from the first vertex object.

5. The method of claim 3, wherein the predetermined group of objects includes a vertex object other than the first vertex object.

6. The method of claim 3, wherein the predetermined group of objects includes a connector other than the connector to the first vertex object.

7. The method of claim 1, including earlier iterations and later iterations of steps 4 through 7, wherein at least some of the proposed connectors generated in the later iterations are longer than proposed connectors generated in the earlier iterations.

8. The method of claim 7, further including the step of displaying the connector with a broken portion if the connector exceeds a predetermined length.

9. The method of claim 7, wherein said at least one predetermined break criterion includes a maximum length for the connector.

10. The method of claim 1, including earlier iterations and later iterations of steps 4 through 7, wherein at least some of the proposed connectors generated in the later iterations have a radius of curvature smaller than proposed connectors generated in the earlier iterations.

11. The method of claim 10, wherein said at least one predetermined break criterion includes a maximum arc length for the proposed connector.

12. The method of claim 1, wherein said at least one predetermined break criterion includes a maximum number of proposed connectors generated.

13. The method of claim 1, further including the step of displaying the connector with broken portion if the connector includes said collision cells, the broken portion being at a position on the monitor corresponding to the collision cells.

14. The method of claim 1, wherein a previously generated connector from the first location to the second location is defined as a noncolliding object, and the connector generated by the method of steps 1-9 is a new connector between the first location and the second location, the new connector and the previously generated connector occupying a common set of cells.

15. The method of claim 14, including, after step 9, the step of generating an object for visually distinguishing between the previously generated connector and the new connector.

16. The method of claim 1, including, before step 9, the steps of:
(10) generating a cell map relating to each cell of the best connector, each cell map referencing a linked list of pointers, with one pointer to each object in the database that includes a cell corresponding to a location occupied by a cell of the best connector; and
(11) storing each generated cell map.

17. The method of claim 16, wherein each of steps 2 and 5 includes the step of traversing the linked list corresponding to each said cell corresponding to the first position or the new position, respectively, for determining which objects in the database are colliding objects.

* * * * *